(12) United States Patent
Honda

(10) Patent No.: US 6,176,065 B1
(45) Date of Patent: Jan. 23, 2001

(54) STACKED STRUCTURE

(75) Inventor: Makoto Honda, Shizuoka (JP)

(73) Assignee: Environmental Assessment Center Co., Ltd., Shizuoka (JP)

( * ) Notice: Under 35 U.S.C. 154(b), the term of this patent shall be extended for 0 days.

(21) Appl. No.: 09/081,069

(22) Filed: May 19, 1998

(30) Foreign Application Priority Data

May 21, 1997 (JP) .................................... 9-130852
Apr. 24, 1998 (JP) ................................... 10-115778

(51) Int. Cl.[7] ............................................... E04C 2/32
(52) U.S. Cl. .................................... 52/783.18; 52/783.15; 52/783.17
(58) Field of Search .............................. 52/741.1, 742.1, 52/169.1, 169.5, 409, 783.11, 783.17, 783.18, 783.15; 405/36, 43, 45

(56) References Cited

U.S. PATENT DOCUMENTS

| | | |
|---|---|---|
| 4,917,536 | 4/1990 | Glasser . |
| 6,003,283 * | 12/1999 | Hull .................................. 52/783.18 |

FOREIGN PATENT DOCUMENTS

| | | |
|---|---|---|
| 0 770 735 | 5/1997 | (EP) . |
| 2 502 458 | 10/1982 | (FR) . |
| 55-26840 | 2/1980 | (JP) . |
| 7310538 | 2/1974 | (NL) . |

* cited by examiner

Primary Examiner—Beth A. Stephan
(74) Attorney, Agent, or Firm—Kanesaka & Takeuchi

(57) ABSTRACT

A stacked structure especially useful for storing water in the underground is formed of a plurality of skeleton members. Each skeleton member includes a plurality of skeleton parts extending in one direction and situated side by side in a lateral direction perpendicular to the one direction. Each skeleton part has one top portion, and two bottom portions extending from the top portion, wherein one bottom portion in one skeleton part is connected to one bottom portion in the adjacent skeleton part. Also, each skeleton part includes top recesses formed at the top portion to be spaced apart from each other at a predetermined interval, and bottom recesses formed at the bottom portions to be spaced apart from each other at a predetermined interval. The skeleton members form upper and lower skeleton members to be vertically stacked together. The skeleton parts of the upper and lower skeleton members extend perpendicularly to each other. The bottom recesses of the upper skeleton member are located in the top recesses of the lower skeleton member so that the upper and lower skeleton members are securely assembled together.

9 Claims, 19 Drawing Sheets

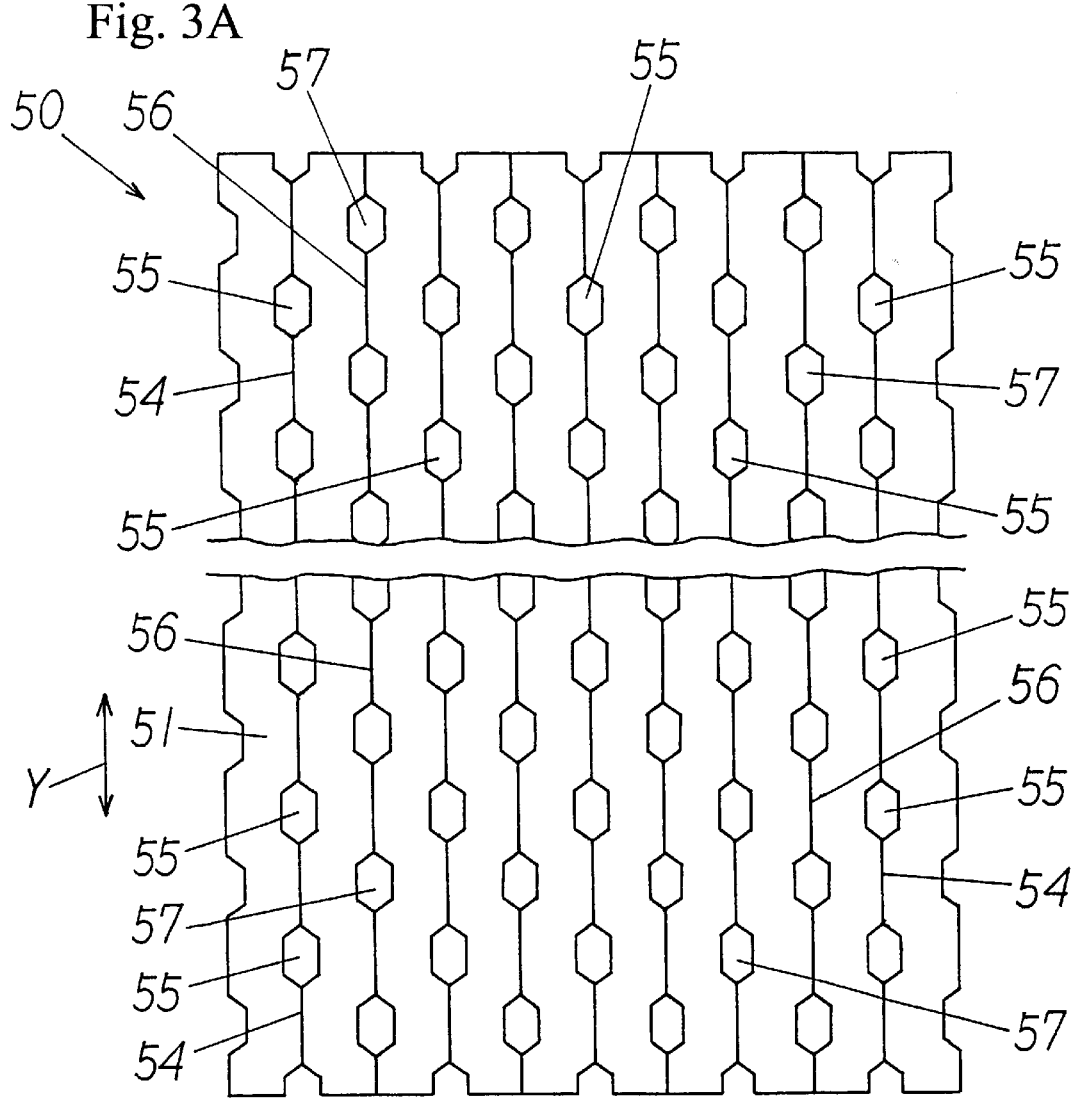
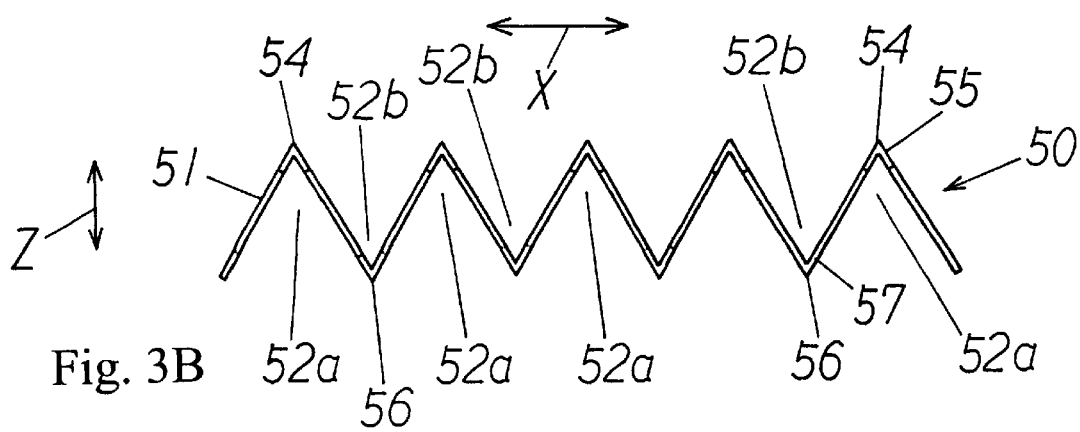

STACKED STRUCTURE

BACKGROUND OF THE INVENTION

1. Field of the Invention

The present invention relates to a stacked structure used as a structure for, e.g., storing water in the underground.

2. Description of the Related Art

There is known a conventional structure for storing water in the underground as disclosed in, e.g., Japanese Unexamined Patent Publication No. 8-184080. The disclosed structure is constructed by excavating in the ground, forming a hollowed portion surrounded by a water-proof layer and a water-proof-layer protective material in the underground, installing a number of perforated pipes within the hollowed portion to fit with one another in close contact relation, and supporting from below an upper floor concrete and a water-proof layer by the perforated pipes. The disclosed structure also includes a water supply pipe and a water discharge pipe both communicating with the hollowed portion and the aboveground.

The conventional structure for storing water in the underground, however, requires a great space in operation of transporting and keeping the perforated pipes, which are to be installed in the hollowed portion, to and in the work site. Also, arranging the perforated pipes so as to fit with one another is not easy and positioning the perforated pipes in place takes time. Another problem is that manufacture of the perforated pipes pushes up a cost due to a complicated configuration thereof.

SUMMARY OF THE INVENTION

The present invention has been made in view of the problems stated above, and its object is to provide a stacked structure which is lightweight and strong in strength, the structure being not limited in applications to storing of water in the underground.

To achieve the above object, according to a first aspect of the present invention, there is provided a stacked structure comprising skeleton members each having mountain-shaped portions or skeleton part with substantially mountain-like shapes successively repeated in one section and substantially the same sectional form extending in a direction perpendicular to the section, the skeleton members being stacked together to form the stacked structure, wherein when stacking the skeleton members together, bottom ends of the mountain-shaped portions with substantially mountain-like shapes successively repeated in one of two adjacent skeleton members are arranged to cross top ends of the mountain-shaped portions of the other skeleton member.

According to a second aspect, there is provided a stacked structure comprising skeleton members each having mountain-shaped portions with substantially mountain-like shapes successively repeated in an X-axis direction and substantially the same sectional form extending in a Y-axis direction orthogonal to the X-axis direction, the skeleton members being stacked together in a Z-axis direction orthogonal to the X-axis direction and the Y-axis direction to form the stacked structure, wherein when stacking the skeleton members together, bottom ends of the mountain-shaped portions with substantially mountain-like shapes successively repeated in one of two skeleton members adjacent each other in the Z-axis direction are arranged to cross top ends of the mountain-shaped portions of the other skeleton member.

According to a third aspect, there is provided a stacked structure comprising skeleton members each having mountain-shaped portions with substantially mountain-like shapes successively repeated in section cut along a Z-axis orthogonal to the X-axis, and substantially the same sectional form extending along a Y-axis orthogonal to both the X-axis and the Z-axis, the skeleton members being stacked together along the Z-axis to form the stacked structure, wherein when stacking the skeleton members together, bottom ends of the mountain-shaped portions with substantially mountain-like shapes successively repeated in one of two skeleton members adjacent each other along the Z-axis are arranged to cross top ends of the mountain-shaped portions of the other skeleton member.

According to a fourth aspect, in the stacked structure according to the first, second or third aspect, the rear side of the mountain-shaped portions is shaped in conformity with the configuration of the mountain-shaped portions on the front side, and individual rear-side spaces are defined on the rear side of the mountain-shaped portions.

According to a fifth aspect, in the stacked structure according to the first, second or third aspect, the rear side of the mountain-shaped portions is shaped in conformity with the configuration of the mountain-shaped portions on the front side, individual rear-side spaces are defined on the rear side of the mountain-shaped portions, and reinforcing members are provided in the individual rear-side spaces to interconnect opposed slopes of the mountain-shaped portions on the rear side for reinforcing the mountain-shaped portions.

According to a sixth aspect, in the stacked structure according to the second or third aspect, bottom recesses provided at the bottom ends of the mountain-shaped portions in one of two adjacent skeleton members stacked in the Z-axis direction are engaged with top recesses provided at the top ends of the mountain-shaped portions of the other skeleton member, the bottom recesses are portions recessed when looking at the bottom ends from the rear side of the skeleton member, and the top recesses are portions recessed when looking at the top ends from the front side of the skeleton member.

According to a seventh aspect, in the stacked structure according to the second or third aspect, bottom recesses provided at the bottom ends of the mountain-shaped portions in one of two adjacent skeleton members stacked in the Z-axis direction are engaged with top recesses provided at the top ends of the mountain-shaped portions of the other skeleton member; the top recesses are portions recessed when looking at the top ends from the front side of the skeleton member, and provide hollow spaces each surrounded by first and second top slopes inclined in respective directions to cross the top end of the mountain-shaped portion, and a third top flat surface connected at both ends to the first and second top slopes and extended parallel to the top end of the mountain-shaped portion; the bottom recesses are portions recessed when looking at the bottom ends from the rear side of the skeleton member, and provide hollow spaces each surrounded by first and second bottom slopes inclined in respective directions to cross the bottom end of the mountain-shaped portion, and a third bottom flat surface connected at both ends to the first and second bottom slopes and. extended parallel to the bottom end of the mountain-shaped portion; each of the top end of the mountain-shaped portion and. the bottom end of the mountain-shaped portion has an included angle θ; the first and second top slopes intersect at an angle θ such that the first and second top slopes are inclined to separate away from each other outward and approach closer inward; the first and second bottom slopes intersect at an angle θ such that the first and second bottom slopes are inclined to separate away from each other outward and approach closer inward; and in a state where the bottom recess is engaged with the top recess, the third top flat surface and the third bottom flat surface lie in opposed relation to each other, the first and second bottom slopes lie in opposed relation to the front side of the mountain-shaped portion of one adjacent skeleton member, and the first and second top slopes lie in opposed relation to the rear side of the mountain-shaped portion of another adjacent skeleton member.

According to an eighth aspect, in the stacked structure according to the first, second or third aspect, the rear side of the mountain-shaped portions is shaped in conformity with the configuration of the mountain-shaped portions on the front side, individual rear-side spaces are defined on the rear side of the mountain-shaped portions, and openings are provided to penetrate the mountain-shaped portions from the front side to the rear side, whereby water is allowed to pass through the openings and a space including the individual rear-side spaces defined between the skeleton members stacked one above another is utilized to store water in the underground.

According to a ninth aspect, in the stacked structure according to the first, second or third aspect, the rear side of the mountain-shaped portions of the lowermost skeleton member is shaped in conformity with the configuration of the mountain-shaped portions on the front side, and individual rear-side spaces are defined on the rear side of the mountain-shaped portions, and lowermost reinforcing members which are flat at lower surfaces are provided in contact relation to the opposed slopes of the mountain-shaped portions on the rear side, thereby filling the individual rear-side spaces of the lowermost skeleton member.

According to a tenth aspect, in the stacked structure according to the first, second or third aspect, a front-side space is defined between two adjacent mountain-shaped portions of the uppermost skeleton member, and a flat surface member having an upper flat surface is provided in contact relation to opposed slopes of the adjacent mountain-shaped portions on the front side so as to fill the front-side space, the upper surface of the flat surface member lying flush with the top ends of the mountain-shaped portions.

Further, according to an eleventh aspect of the present invention, there is provided a stacked structure comprising skeleton members each having mountain-shaped portions with substantially mountain-like shapes successively repeated in an X-axis direction, top recesses and bottom recessed provided respectively in top ends and bottom ends of the mountain-shaped portions, and substantially the same sectional form extending in a Y-axis direction orthogonal to the X-axis direction, the skeleton members being juxtaposed in a plane extending in the X-axis direction and the Y-axis direction orthogonal to the X-axis direction, the skeleton members being stacked and juxtaposed on the juxtaposed skeleton members in a Z-axis direction orthogonal to the X-axis direction and the Y-axis direction, thereby forming stages of the stacked structure successively in the Z-axis direction, wherein the mountain-shaped portions of the skeleton members each stacked in the Z-axis direction on two adjacent skeleton members in the above plane are arranged in crossed and straddling relation to the mountain-shaped portions of the two adjacent skeleton members in the above plane; the bottom recesses of the skeleton member stacked in the Z-axis direction on the two adjacent skeleton members in the above plane are engaged with the top recesses of the two adjacent skeleton members in the above plane; the top recesses are portions recessed when looking at the top ends from the front side of the skeleton member; and the bottom recesses are portions recessed when looking at the bottom ends from the rear side of the skeleton member.

BRIEF DESCRIPTION OF THE DRAWINGS

FIG. 3A is a schematic front view of the skeleton member of FIG. 2 and FIG. 3B is a schematic plan view of the skeleton member of FIG. 2.

DESCRIPTION OF THE PREFERRED EMBODIMENTS

Figure 1:
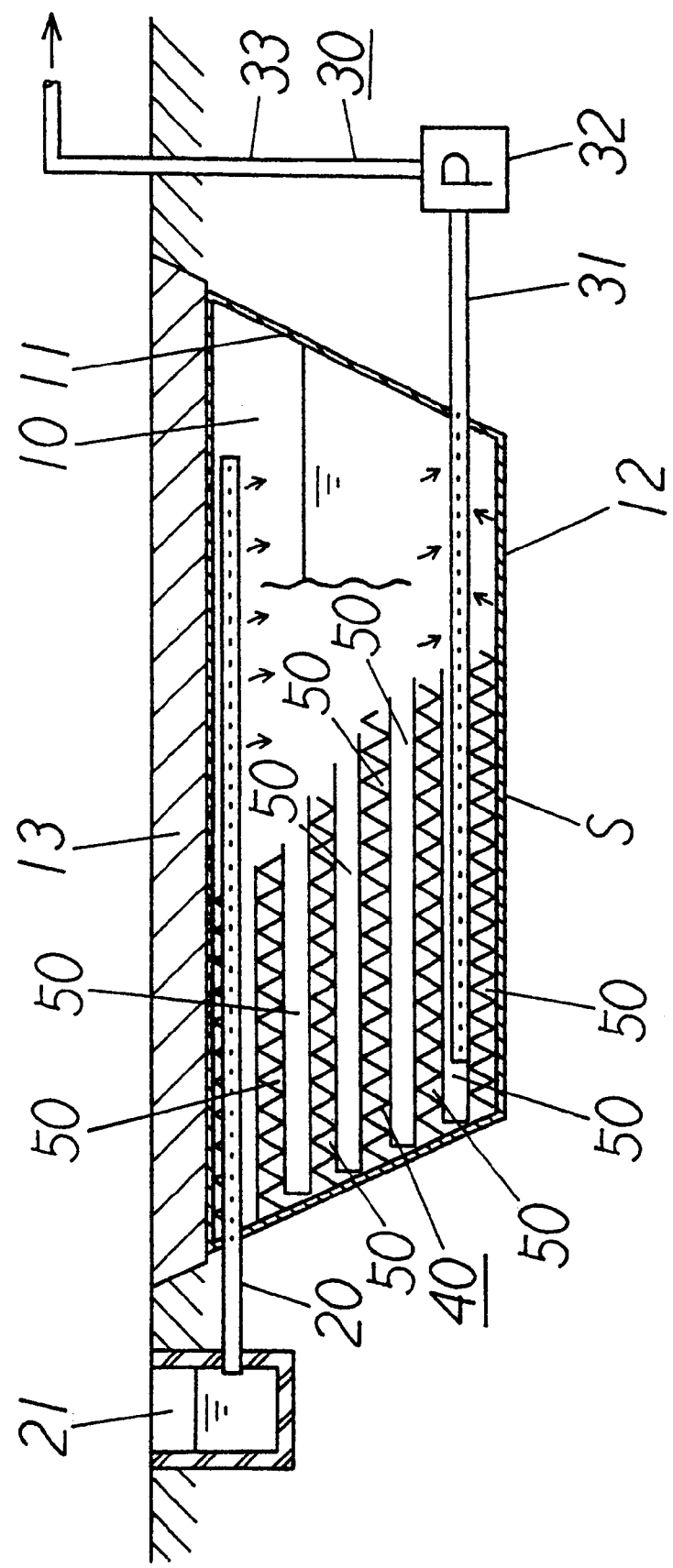
FIG. 1 is a schematic sectional view of an underground water-storing structure using a stacked structure according to one embodiment of the present invention.

Embodiments of the present invention will be described below with reference to the drawings. As one embodiment of a stacked structure according to the present invention, a sectional view of FIG. 1 shows an underground water-storing structure wherein the stacked structure is used to provide a structure for storing water in the underground. A space 10 is formed by excavating in the ground, and side walls 11 of the space 10 have sloped surfaces. The side walls 11 and a floor surface 12 of the space 10 are subjected to a conventional water-shielding treatment, thereby defining a water-shielding space. Thus permeation of water between the interior and exterior of the space is cut off.

Figure 2:
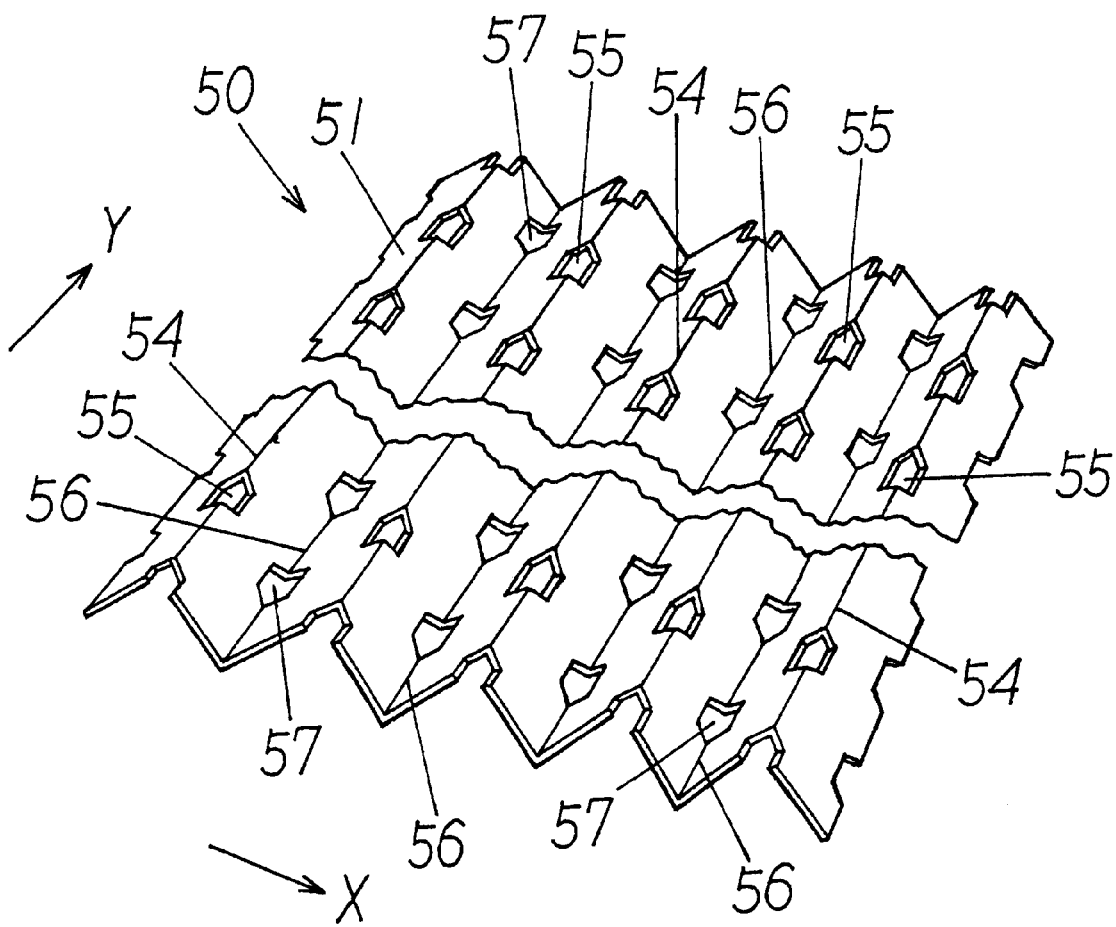
FIG. 2 is a schematic perspective view of a skeleton member used in FIG. 1.
Figure 4:
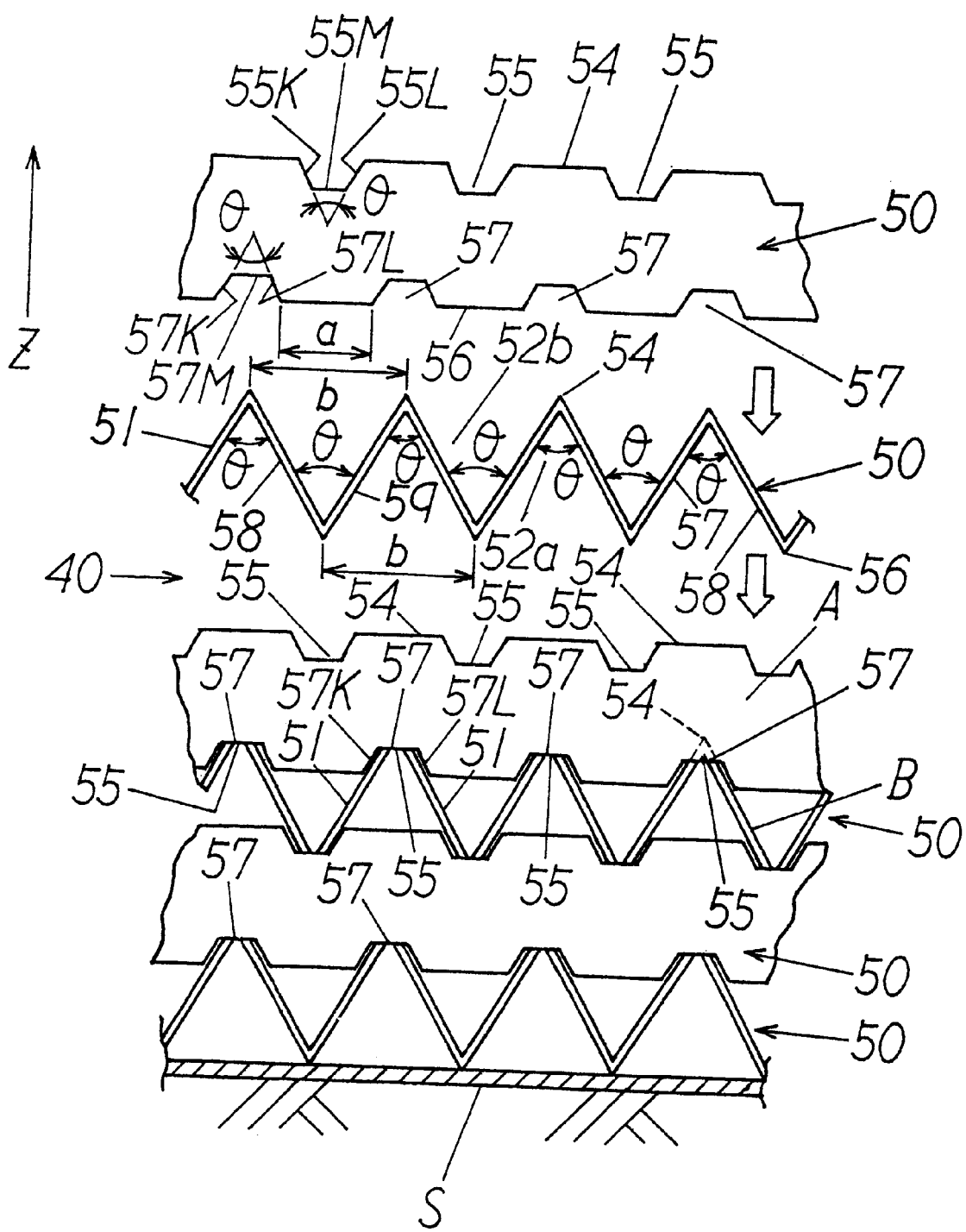
FIG. 4 is a schematic view showing a state where the skeleton members each shown in FIG. 2 are stacked in crossed relation.

Incidentally, the term "water-shielding treatment" used herein means that a water-shielding sheet S is disposed to cover peripheries of a stacked structure 40, which is formed by, e.g., stacking skeleton members 50 (or plate-like members) shown in FIGS. 2, 3A and 3B in such a state as shown in FIGS. 1 and 4, i.e., bottom, side and top surfaces of the stacked structure 40, thereby defining a water-shielded space within the surrounding sheet S, the space being utilized to store water in the underground.

Further, as shown in FIG. 1, a receiving reservoir 21 for collecting rainwater, etc. is provided in the ground surface. A water conduit 20 (water introducing portion) for introducing rainwater, etc. from the receiving reservoir 21 to an upper portion of the water-shielded space is provided to, for example, penetrate the water-shielded space S. Accordingly, rainwater, etc. are supplied from the receiving reservoir 21 to the water-shielded space through the water conduit 20.

In the water-shielded space, the skeleton members 50 are stacked one above another. Each of the skeleton members 50 has top cut-out recesses 55 and bottom cut-out recesses 57, described later, formed therein to function as openings allowing water to pass through them. With water allowed to pass through the openings (top recesses 55 and bottom recesses 57), the space including individual rear-side spaces 52a formed between the stacked skeleton members 50, as described later, is utilized as an underground water-storing tank.

In addition, a discharge unit 30 is provided to discharge rainwater, etc. from the interior of the water-shielded space to the exterior of the water-shielded space, e.g., a tank (not shown) on the ground surface. The discharge unit 30 comprises, for example, a discharge pipe 31 provided to penetrate the water-shielding sheet S, a pump 32 and a water delivery pipe 33. The discharge pipe 31 is arranged in a lower portion of the water-shielded space to interconnect the interior and exterior of the water-shielded space. Rainwater, etc. in the water-shielded space are sent by the pump 32 from the discharge pipe 31 to the water delivery pipe 33.

Provided within the water-shielded space is the stacked structure 40 which comprises the skeleton members 50 (or plate-like members) stacked in crossed, e.g., orthogonal, relation and has a vacant space therein.

As shown in FIGS. 2, 3A and 3B, the skeleton members 50 are substantially rectangular in plan view and have such a form as obtained by folding a flat plate, which is substantially uniform in thickness, parallel to a long side (extending in a Y-axis direction Y) alternately while advancing along a short side (i.e., in an X-axis direction X), the form including mountain-shaped portions 51 with mountain-like shapes successively repeated in the X-axis direction. A perspective view of the skeleton member 50 is shown in FIG. 2.

In other words, each skeleton member 50 (or plate-like member) has;

the mountain-shaped portions or skeleton parts 51 with substantially mountain-like shapes successively repeated in one section and substantially the same sectional form extending in a direction perpendicular to the above section, specifically, the mountain-shaped portions 51 with substantially mountain-like shapes successively repeated in the X-axis direction X and substantially the same sectional form extending in the Y-axis direction Y orthogonal to the above X-axis direction X, and more specifically, the mountain-shaped portions 51 with substantially mountain-like shapes successively repeated in section cut along both an X-axis and a Z-axis orthogonal to the X-axis, and substantially the same sectional form extending along a Y-axis orthogonal to both the X-axis and the Z-axis.

Further, the skeleton member 50 (or plate-like member) has the top recesses 55 and the bottom recesses 57 through which the skeleton members 50 to be stacked are engaged with each other. The top recesses 55 and the bottom recesses 57 are formed to function not only as means for holding the skeleton members 50 in place, but also as openings penetrating the mountain-shaped portions 51 from the front side to the rear side so that water is allowed to pass through the top recesses 55 and the bottom recesses 57. Incidentally, the bottom recesses 57 imply cut-out portions recessed when looking at a bottom end 56 from the rear side of the skeleton member 50, and the top recesses 55 imply cut-out portions recessed when looking at a top end 54 from the front side of the skeleton member 50.

Figure 6:
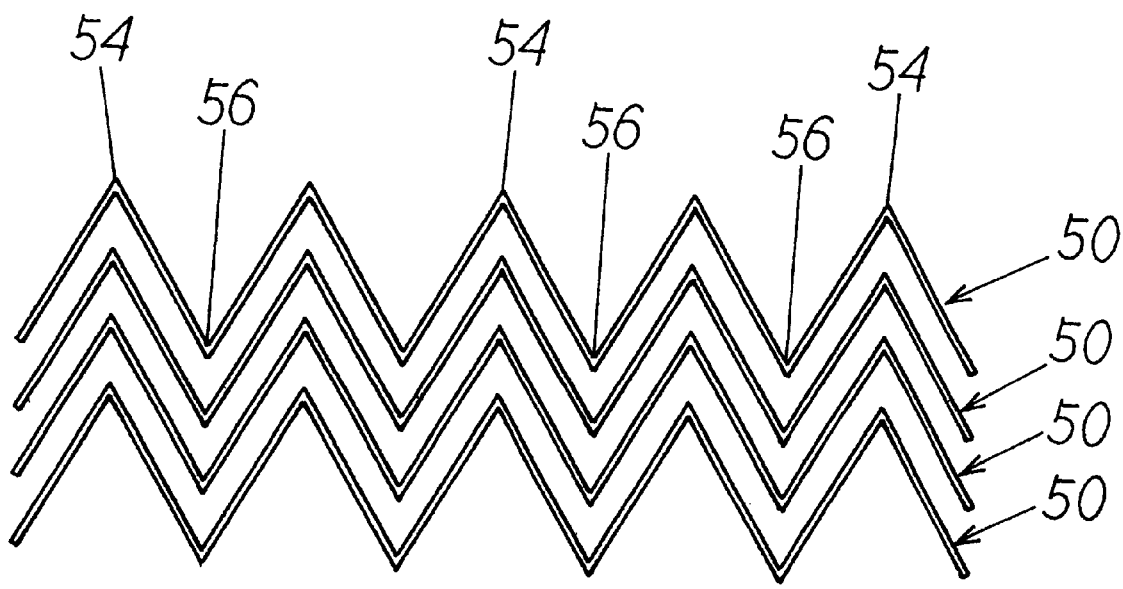
FIG. 6 is a schematic view showing a state where the skeleton members each shown in FIG. 2 are stacked one above another in the same direction.

The skeleton member 50 is substantially uniform in thickness, and the mountain-like shape on the front side is substantially the same as the mountain-like shape on the rear side. Stated otherwise, the rear side of the mountain-shaped portions 51 is shaped in conformity with the form of the mountain-shaped portions 51 on the front side and the individual rear-side spaces 52a are defined on the rear side of the mountain-shaped portions 51, as shown in FIGS. 2 and 3B. Accordingly, when the skeleton members 50 are stacked successively in the same orientation, they are placed together in closely contact relation. On the other hand, when the skeleton members 50 are stacked successively to extend in orthogonal directions as shown in FIG. 4, there is defined a space between one skeleton member 50 and another skeleton member 50 (the space including the individual rear-side spaces 52a defined on the rear side of the mountain-shaped portions 51 and individual front-side spaces 52b defined on the front side of the mountain-shaped portions 51, as shown in FIGS. 3B and 4). By transporting and keeping the skeleton members 50 while stacking them in the same orientation as shown in FIG. 6, therefore, a required space can be reduced. Also, the stacked structure 40 shown in FIG. 4 can be constructed as a structure having spaces therein and a relatively small density.

Although the stacked structure 40 can be held as an integral structure by using, e.g., fasteners (not shown) or the like after stacking the skeleton members 50 one above another, it can also be kept integral by merely fitting the top recesses 55 and the bottom recesses 57 (in the form of, e.g., cut-out portions) with each other.

When forming the stacked structure 40 by stacking the skeleton members 50 together in the Z-axis direction orthogonal to both the X-axis direction and the Y-axis direction, the skeleton members 50 are arranged to extend in orthogonal relation, but not limited to the orthogonal arrangement. The skeleton members 50 may be stacked (in the Z-axis direction Z) such that the upper and lower mountain-shaped portions at least cross each other.

In other words, as shown in FIG. 4, two skeleton members 50 adjacent to each other in the Z-axis direction Z are stacked in such an arrangement that the bottom ends 56 of the successive mountain-shaped portions 51 of one skeleton member 50 (shown at, by way of example, character A) cross (more desirably perpendicularly intersect) the top ends 54 of the successive mountain-shaped portions 51 of the other skeleton member 50 (shown at, by way of example, character B).

Here, the entire density (weight) of the stacked structure 40 can be appropriately designed depending on applications, and materials of the skeleton members 50 constituting the stacked structure 40 can be properly selected from, e.g., synthetic resins and metals.

The skeleton members 50 can also be manufactured by molding a resin with a mold. The molding process can contribute to reducing a cost and a further reduction in weight. The skeleton member 50 may be integrally molded to be incapable of extending and contracting (or pivoting) such that it does not open at folds (the top ends 54 and the bottom ends 56), or may be formed such that it can extend and contract (or pivot through a hinge structure) in the X-axis direction X at the folds (the top ends 54 and the bottom ends 56).

Figure 7:
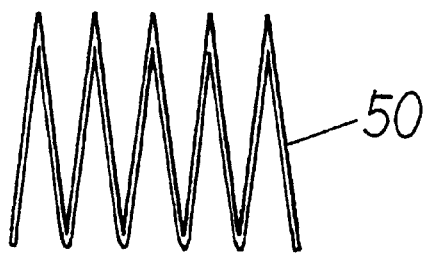
FIG. 7 is a schematic view of a skeleton member which is formed in foldable fashion, the skeleton member being in a folded state.

In the latter case, the skeleton member 50 is spread into an extended state when used, but can be folded into a contracted state as shown in FIG. 7 when transported to and kept in the work site. This enables the skeleton member 50 to be easily handled in transporting and keeping it, and also contributes to reducing a required space. There is no problem in holding the skeleton member 50 in a state having the predetermined mountain-like shape. In case the folds cannot hold the skeleton member 50 in the predetermined mountain-like shape and the skeleton member 50 is fully extended into a flat state, the stacked structure 40 can be obtained as a stable structure by providing means for restricting the skeleton member 50 from being extended and contracted in the X-axis direction X when stacked, e.g., later-described cutouts through which the skeleton members 50 are fitted with each other.

Figure 5:
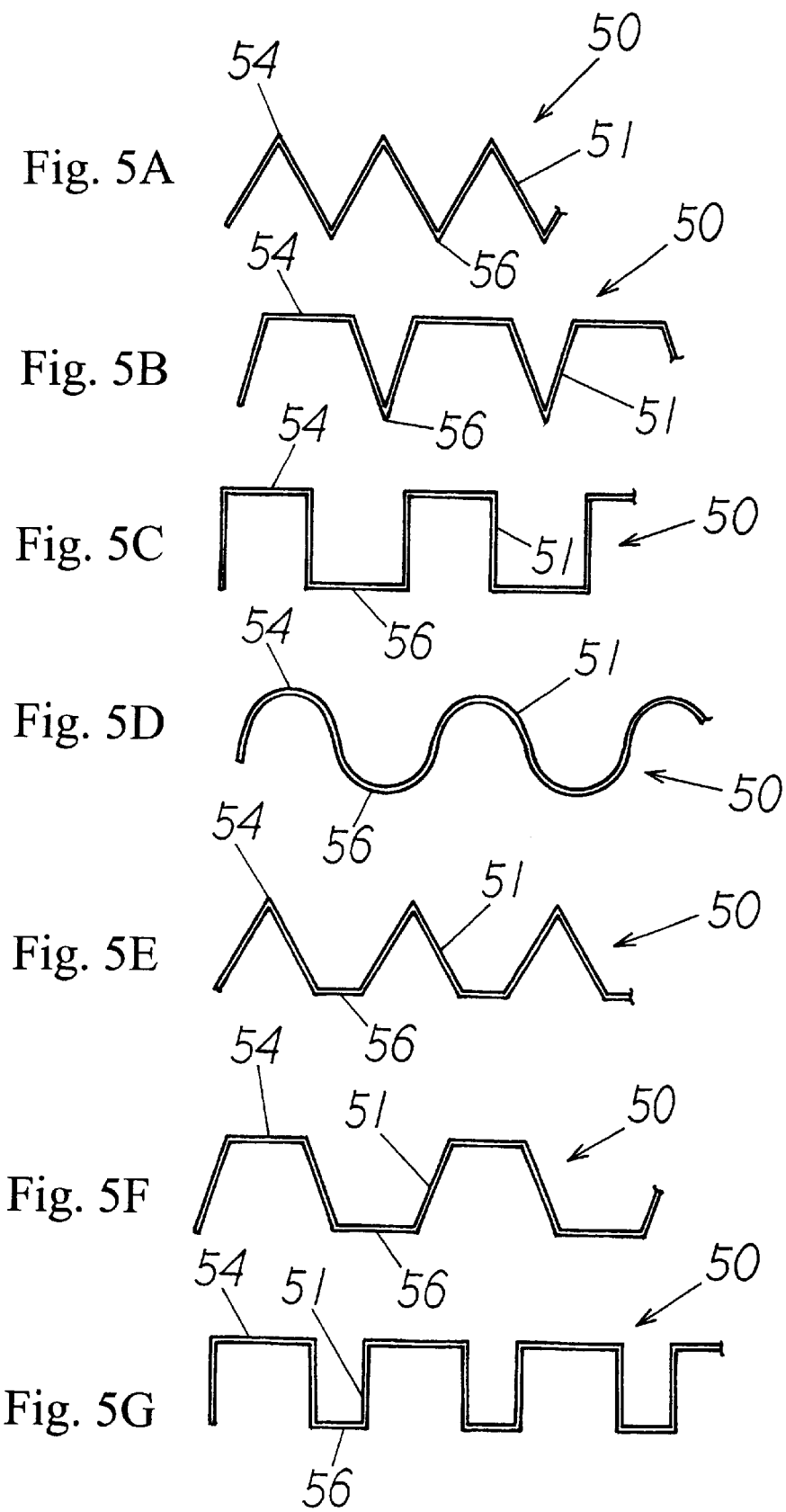
FIGS. 5A to 5G are schematic sectional views showing various examples of mountain-shaped portions of the skeleton member of FIG. 2.

The scope of "the mountain-shaped portions 51 with substantially mountain-like shapes" which constitute the skeleton member 50 in the present invention is not limited to a mountain-like shape successively repeated in one direction as shown in FIG. 5A, but may include a shape having a flat top in the mountain-like shape as shown in FIG. 5B, a shape with vertical walls as shown in FIG. 5C, and a wavy shape as shown in FIG. 5D. In addition, it may also include a shape having a flat portion between the mountain-like shapes adjacent to each other, as well as a flat portion in each mountain-shaped portion, these flat portions being equidistantly or inequidistantly spaced, as shown in FIGS. 5E, 5F and 5G. The type and size of the mountain-shaped portions can be determined case by case in consideration of various conditions in use.

In this embodiment, the outer configuration of each skeleton member 50 is rectangular in plan view as shown in FIGS. 2, 3A and 3B, but it may be suitably shaped corresponding to the form of the water-shielded space intended without being limited to the rectangular shape.

Also, while the skeleton member 50 is substantially uniform in thickness, the thickness may be partly changed to some extent, or the stack height may be changed in the direction in which the skeleton members 50 are stacked one above another.

It is thus only required for the outer configuration of the skeleton member 50 that the rear surfaces of the mountain-shaped portions 51 having successive mountain-like shapes on the front side are formed in conformity with the configuration of front surfaces of the mountain-shaped portions 51 having the successive mountain-like shapes, and the individual rear-side spaces 52*a* are defined on the rear side of the mountain-shaped portions 51.

Engagement between the skeleton members 50 stacked together to construct the stacked structure 40 will be described below. As shown in FIGS. 2, 3A and 3B, the top recesses 55 and the bottom recesses 57 are provided in plural number respectively at the top ends 54 and the bottom ends 56 of the mountain-shaped portions 51 along the folds (the top ends 54 and the bottom ends 56) with predetermined intervals therebetween. Because the top recesses 55 and the bottom recesses 57 are in the form of cutouts, a reduction in space required for transporting and keeping the skeleton members is not impaired.

As shown in FIG. 4, a predetermined interval a between the top recesses 55, and between the bottom recesses 57 is set smaller than an open end interval b between the adjacent top ends 54 an 54 (or adjacent bottom ends 56 and 56) in the mountain-shaped portions 51 each having a first leg portion 58 and a second leg portion 59 coupled to each other at the top end 54.

Of two adjacent skeleton members 50 stacked in the Z-axis direction Z, therefore, the bottom recesses 57 formed at the bottom ends 56 of the mountain-shaped portions 51 of one skeleton member 50 (shown at, by way of example, character A in FIG. 4) are respectively engaged with the top recesses 55 formed at the top ends 54 of the mountain-shaped portions 51 of the other skeleton member 50 (shown at, by way of example, character B in FIG. 4).

Particularly, as shown in FIG. 4, the top recesses 55 are each defined as a hollow space surrounded by first and second top slopes 55K, 55L inclined in respective directions to cross the top end 54 of the mountain-shaped portion 51, and a third top flat surface 55M connected at both ends to the first and second top slopes 55K, 55L and extended parallel to the top end 54 of the mountain-shaped portion 51. The bottom recesses 57 are each defined as a hollow space surrounded by first and second bottom slopes 57K, 57L inclined in respective directions to cross the bottom end 56 of the mountain-shaped portion 51, and a third bottom flat surface 57M connected at both ends to the first and second bottom slopes 57K, 57L and extended parallel to the bottom end 56 of the mountain-shaped portion 51.

Further, the top end 54 and the bottom end 56 of the mountain-shaped portion 51 have each an included angle $\theta$. The first and second top slopes 55K, 55L also intersect at an angle $\theta$ such that they are inclined to separate away from each other outward and approach closer inward. Likewise, the first and second bottom slopes 57K, 57L intersect at an angle θ such that they are inclined to separate away from each other outward and approach closer inward.

Accordingly, in a state where the bottom recess 57 is engaged with the top recess 55, the third top flat surface 55M and the third bottom flat surface 57M lie in opposed (more desirably contact) relation to each other, the first and second bottom slopes 57K, 57L of one skeleton member 50 (shown at, by way of example, character A in FIG. 4) lie in opposed (more desirably contact) relation to the front side of the mountain-shaped portion 51 of the other skeleton member 50 (shown at, by way of example, character B in FIG. 4), and the first and second top slopes 55K, 55L of one skeleton member 50 lie in opposed (more desirably contact) relation to the rear side of the mountain-shaped portion 51 of another adjacent skeleton member 50. Then, the bottom recess 57 and the top recess 55 are tightly engaged (more desirably fitted) to each other such that the tightly engaged skeleton members 50 are prevented from moving in the X-axis and Y-axis directions while being allowed to move only in the Z-axis direction Z (when loosely fitted, the skeleton members 50 are movable in the X-axis and Y-axis directions as well).

The bottom recesses 57 each have a substantially hexagonal shape in plan view as shown in FIGS. 2 and 3A. Note that the top recesses 55 and the bottom recesses 57 can also serve as openings allowing water to pass therethrough because they are formed to penetrate the skeleton member 50 from the front side to the rear side.

The intervals between the adjacent top recesses 55 and between the adjacent bottom recesses 57 along the folds (the top ends 54 and the bottom ends 56) are selected, as explained above, such that the top recesses 55 and the bottom recesses 57 are engaged with each other when the skeleton members 50 are stacked in orthogonal directions.

The optimum intervals between the adjacent top recesses 55 and between the adjacent bottom recesses 57 can be therefore determined depending on the size and configuration of the mountain-shaped portions 51 of the skeleton members 50.

The top recesses 55 and the bottom recesses 57 are provided in positions shifted a half pitch from one another in the Y-axis direction Y. With that relative positional relationship, it is possible to stack the structure in the upright direction (Z-axis direction Z) by using one type of skeleton members 50, reduce types of skeleton members 50 to be used, and hence lower a cost. Additionally, the stacked structure 40 can be formed into various shapes by changing the relative positional relationship as required.

In the case of folding the flat skeleton member 50 to form the mountain-shaped portions 51 as stated above, the top recesses 55 and the bottom recesses 57 can be provided in similar fashion.

FIG. 4 shows a state where the skeleton members 50 are stacked and engaged with each other between adjacent two. Engagement between the top recesses 55 and the bottom recesses 57 enables the skeleton members 50 to be stacked together in orthogonal direction with no need of positioning, makes easier the work of stacking the skeleton members 50, and increases the working efficiency.

Further, by tightly fitting the top recesses 55 and the bottom recesses 57 with each other in the stacked state, the skeleton members 50 are restricted from moving in the X-axis and Y-axis directions. With a load applied to the stacked structure from above, therefore, the skeleton members 50 are kept from disengaging from the fitted state and the need of fixing the skeleton members 50 in place by fasteners or the like is eliminated. This results in even easier stacking work, the reduced number of parts, an improvement of the working efficiency, a reduction in cost, and so on.

For the skeleton member 50 capable of extending and contracting along the folds (the top ends 54 and the bottom ends 56) as stated above, extension and contraction of the skeleton member 50 are restricted by the top recesses 55 and the bottom recesses 57 fitting with each other. Incidentally, hinge-like extension and contraction of the skeleton member 50 (movement of the leg portions thereof) in the lowermost stage can be restricted by using, e.g., an auxiliary member 61 (lower flat plate) shown in FIG. 8.

When neither cutouts nor recesses are provided in the skeleton members 50, the stacked structure rises in the Z-axis direction Z in increment corresponding to the height of the individual rear-side spaces 52a on the rear side of the mountain-shaped portions 51 for each stage when the skeleton members 50 are stacked together such that the X-axis direction X of the skeleton member 50 crosses alternately. With the provision of cutouts or the like, the skeleton members 50 are engaged with each other when stacked and the height of the stacked structure per stage is reduced correspondingly. However, the above-stated advantages of eliminating the need of positioning, making easier the stacking work, etc. can be achieved.

In this embodiment, the skeleton members 50 are all provided with cutouts in the same pattern and stacked together while meshing with each other at the cutouts so that the skeleton members 50 are restricted from moving in the X-axis and Y-axis directions. However, the cutouts may be provided, for example, such that the skeleton members 50 are allowed to move only in any one direction. By so providing the cutouts, the stacked structure 40 can be easily stacked to have an inclined surface and hence can be adapted for the water-shielded space having an inclined surface.

After laying the individual skeleton members 50 over a plane extending in the X-axis direction X and the Y-axis direction Y while stacking them in the Z-axis direction Z until the stacked structure 40 is stacked up to a position near the ground surface, a ceiling portion 13 capable of shielding penetration of water therethrough is placed to cover the water-shielded space and level with the ground surface, as shown in FIG. 1. Since the skeleton members 50 are stacked together with the cutouts fitted to each other, water passages can be secured by the presence of the top recesses 55 and the bottom recesses 57. Further, the flat working surface can be achieved by providing a top plate 62 (upper flat plate), shown in FIG. 8, over the skeleton members 50 in the uppermost stage and a bottom plate 61 (lower flat plate), shown in FIG. 8, under the skeleton members 50 in the lowermost stage.

In the above-explained embodiment, the top recesses 55 and the bottom recesses 57 of the mountain-shaped portions 51 are formed as openings which penetrate the skeleton member 50 from the front side to the rear side and have functions to not only hold the skeleton members 50 through mutual engagement but also allow water to pass therethrough. However, if the top recesses 55 and the bottom recesses 57 are made open entirely, the strength of the skeleton members 50 may not be held at a satisfactory level in some cases.

Figure 9:
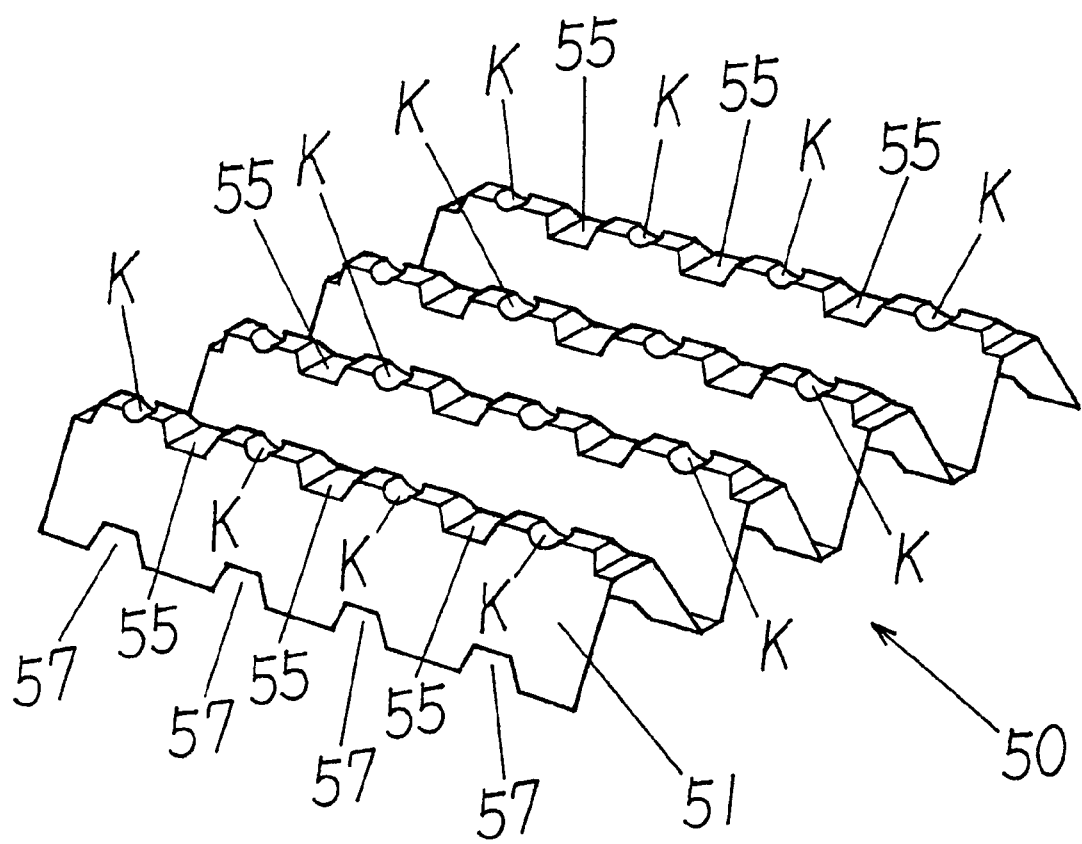
FIG. 9 is a schematic perspective view of a modification of the skeleton member shown in FIG. 8.

In such a case, each skeleton member 50 may have top recesses 55 and bottom recesses 57 which are dented, but have no through holes, for example, as shown in FIG. 9. This case requires that openings K penetrating the mountain-shaped portions 51 from the front side to the rear side are separately provided as holes allowing water to pass therethrough in appropriate positions such as the top ends, bottom ends or slopes of the mountain-shaped portions 51. For example in FIG. 9, the openings K are provided at the top ends.

Figure 10A:
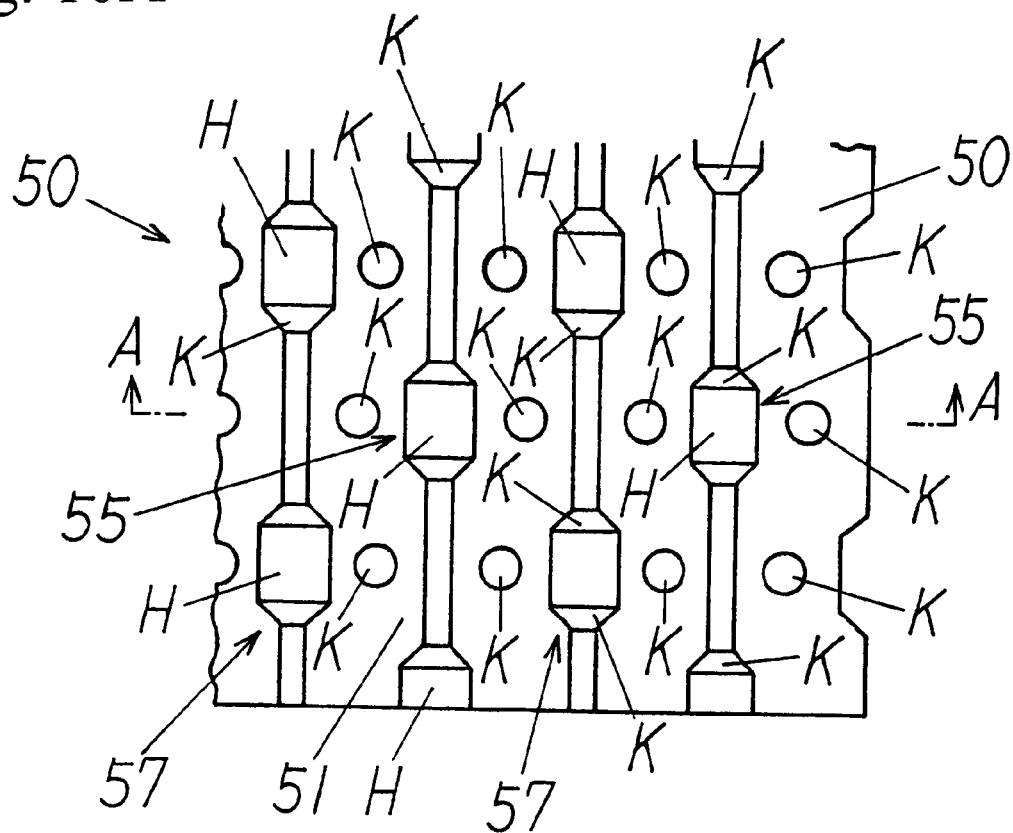
FIG. 10A is a schematic partly-enlarged plan view showing part of FIG. 3 in enlarged scale and FIG. 10B is a schematic sectional view taken along line 10B—10B in FIG. 10A.
Figure 10B:
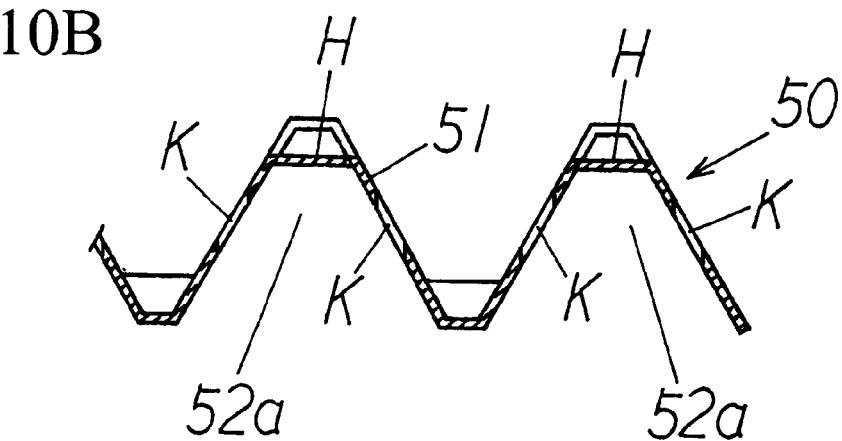
Figure 11A:
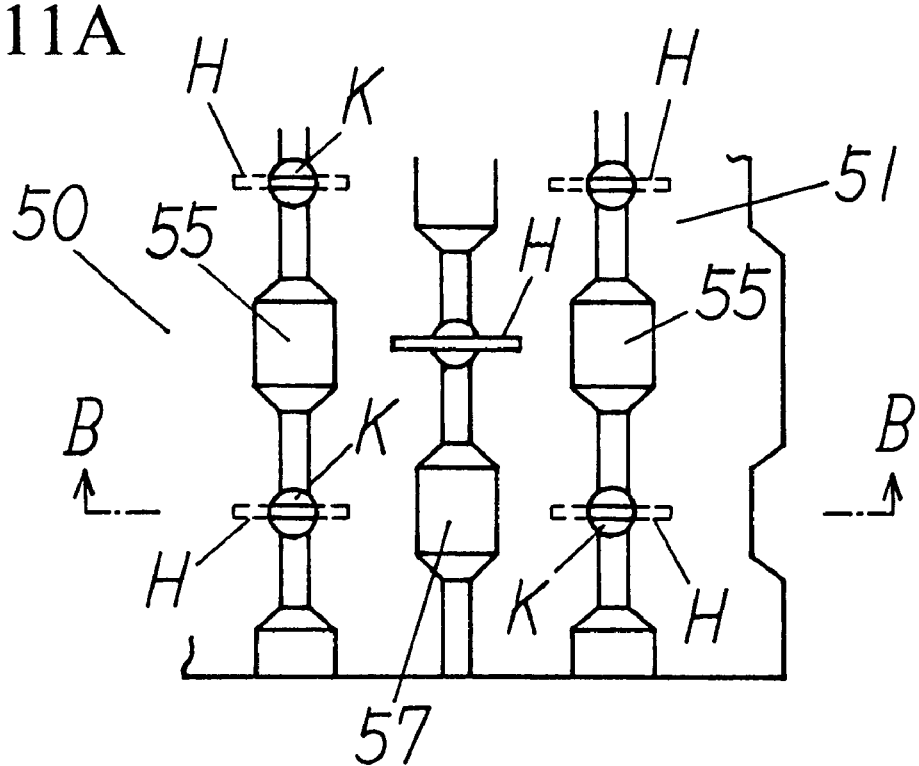
FIG. 11A is a schematic partly-enlarged plan view showing a modification of the skeleton member :shown in FIG. 10A
Figure 11B:
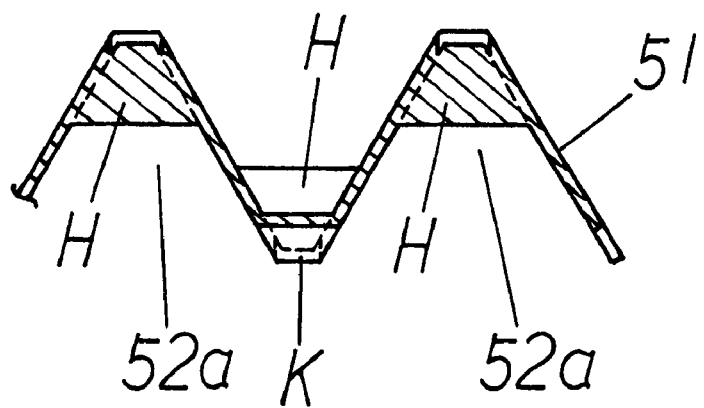
FIG. 11B is a schematic sectional view taken along line 11B—11B in FIG. 11A.

More specifically, the top recesses 55 and the bottom recesses 57 may be entirely closed as shown in FIG. 9. As an alternative, as shown in FIGS. 10A and 10B, the top recesses 55 and the bottom recesses 57 may be partly closed by reinforcing members H which are provided in the individual rear-side spaces 52*a* to interconnect the slopes on the rear side of the mountain-shaped portions 51 while reinforcing the mountain-shaped portions 51 (with the openings K left in the top recesses 55 and the bottom recesses 57). Further, as shown in FIGS. 11A and 11B, reinforcing members H may be provided in the individual rear-side spaces 52*a* to interconnect the slopes on the rear side of the mountain-shaped portions 51 awhile the top recesses 55 and the bottom recesses 57 are entirely closed, thereby enhancing the strength of the mountain-shaped portions 51.

Figure 12:
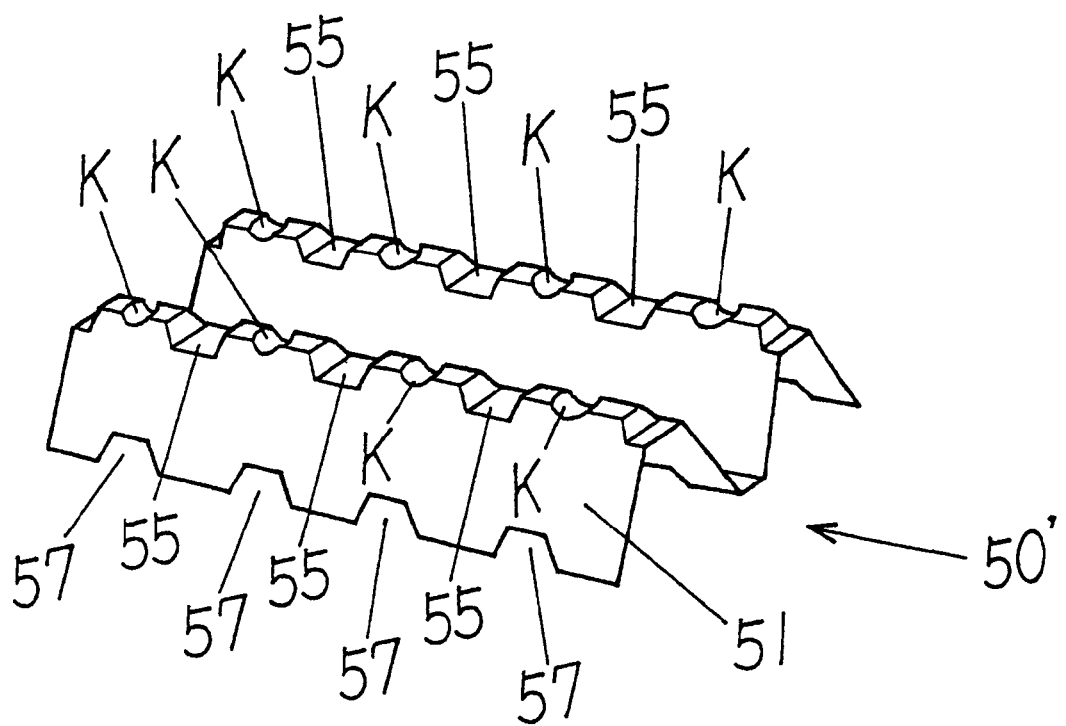
FIG. 12 is a schematic perspective view showing a modification of the skeleton member shown in FIG. 9.
Figure 13:
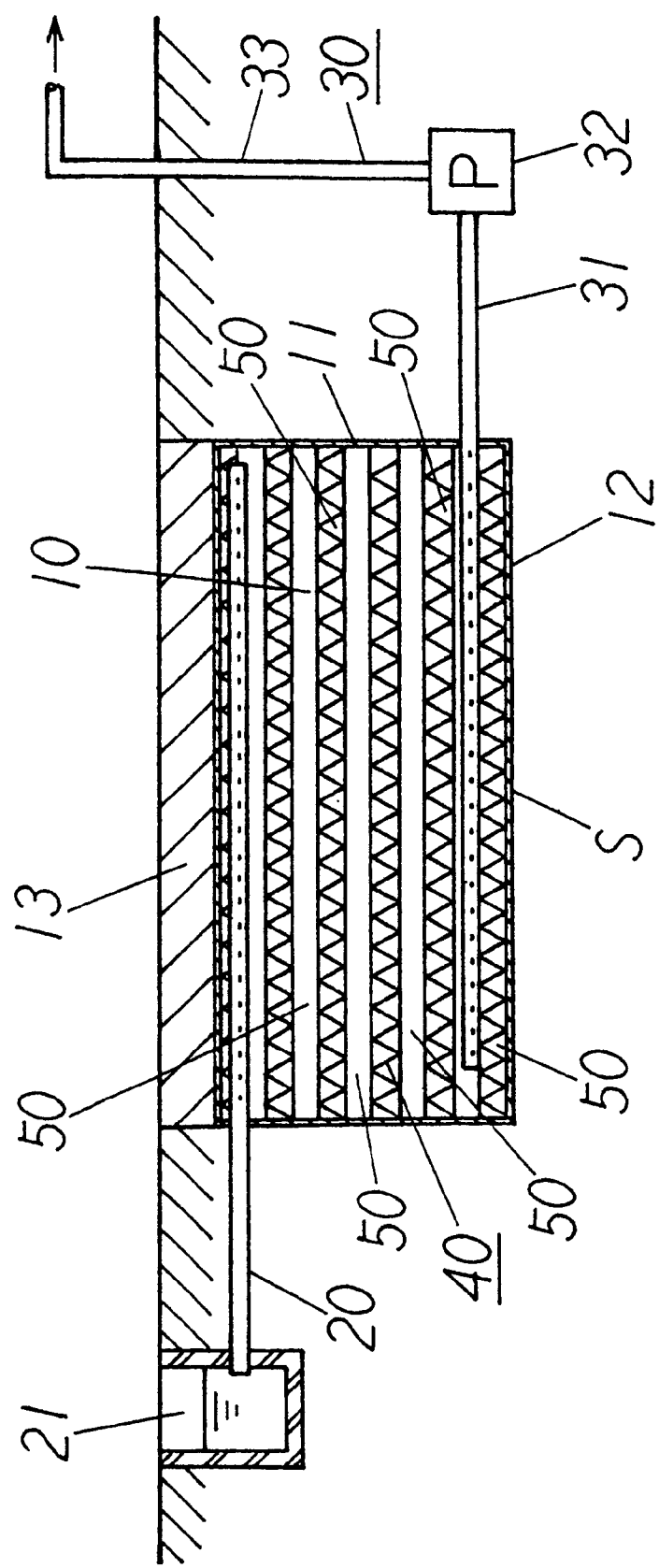
FIG. 13 is a schematic sectional view showing a modification of the underground water-storing structure shown in FIG. 1.

Furthermore, a stacked structure 40 shown in FIG. 13 can be formed by using skeleton members 50, 50' shown in FIGS. 9 and 12, respectively. Each of the skeleton members 50, 50' has the mountain-shaped portions 51 with substantially mountain-like shapes successively repeated in the X-axis direction X, the top recesses 55 provided in the top ends 54 of the mountain-shaped portions 51, and substantially the same sectional form extending in the Y-axis direction Y orthogonal to the X-axis direction X. For example, the mountain-shaped portions 51 of the skeleton members 50 are provided in four lines (see FIG. 9) and the mountain-shaped portions 51 of the skeleton members 50' are provided in two lines (see FIG. 12).

Figure 14:
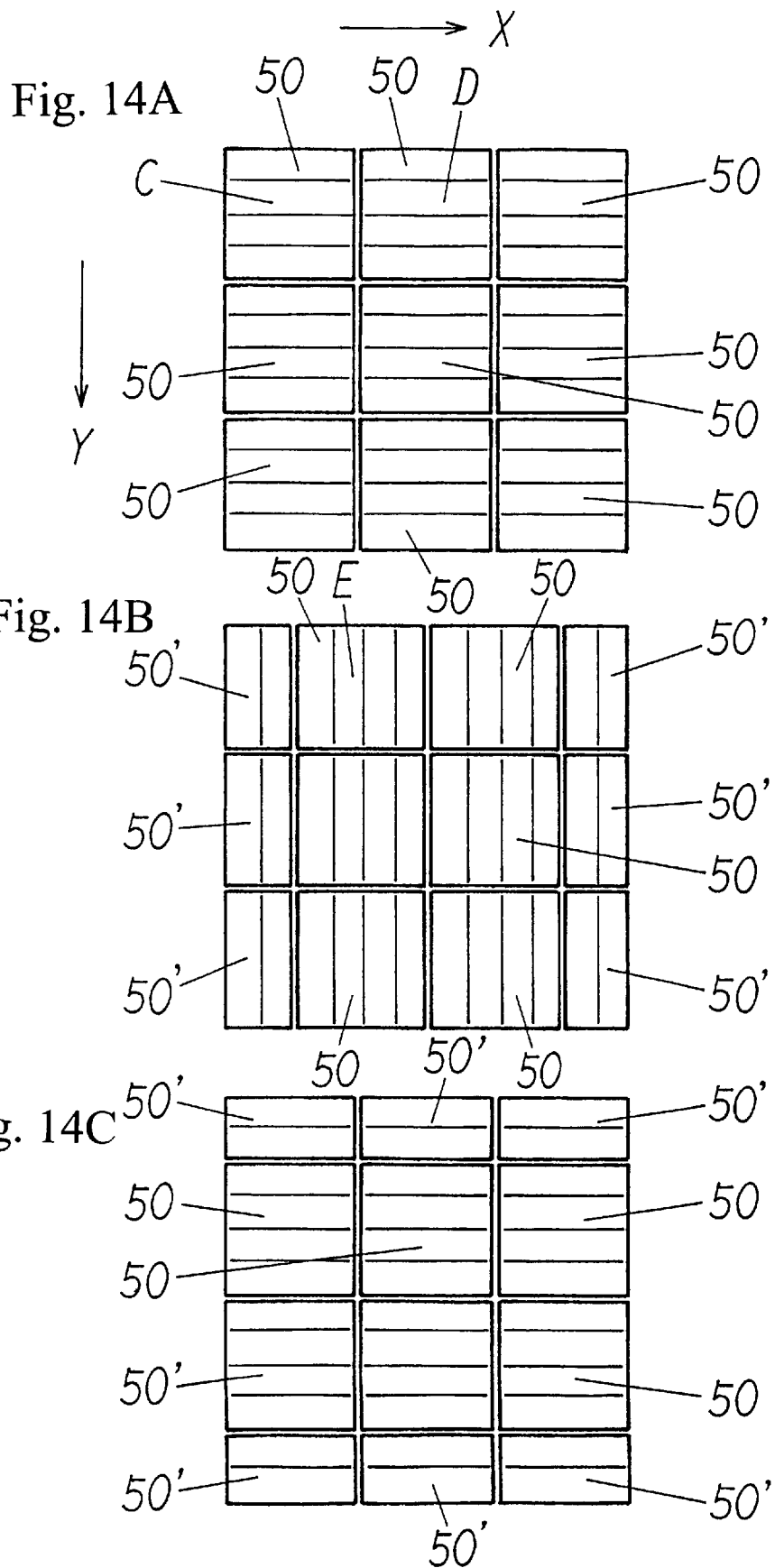
FIG. 14A is a schematic plan view of a state where the skeleton members each shown in FIG. 2 are arranged in juxtaposed relation to form a first stage.
FIG. 14B is a schematic plan view of a state where the skeleton members each shown in FIG. 2 are arranged in juxtaposed relation to form a second stage on the first stage.
FIG. 14C is a schematic plan view of a state where the skeleton members each shown in FIG. 2 are arranged in juxtaposed relation to form a third stage on the second stage.

Then, as shown in FIG. 14A, the skeleton members 50 are arranged in juxtaposed relation over a plane extending in the X-axis direction X and the Y-axis direction Y orthogonal to the X-axis direction to form a first stage (lowermost layer). Over the juxtaposed skeleton members 50, as shown in FIGS. 14B and 14C, the skeleton members 50, 50' are juxtaposed and stacked in the Z-axis is direction Z orthogonal to both the X-axis direction X and the Y-axis direction Y. Second, third and further stages of the skeleton members 50 are thus stacked successively in the Z-axis direction Z, thereby forming the stacked structure 40 in the form of a rectangular parallelepiped shown in FIG. 13.

Figure 15:
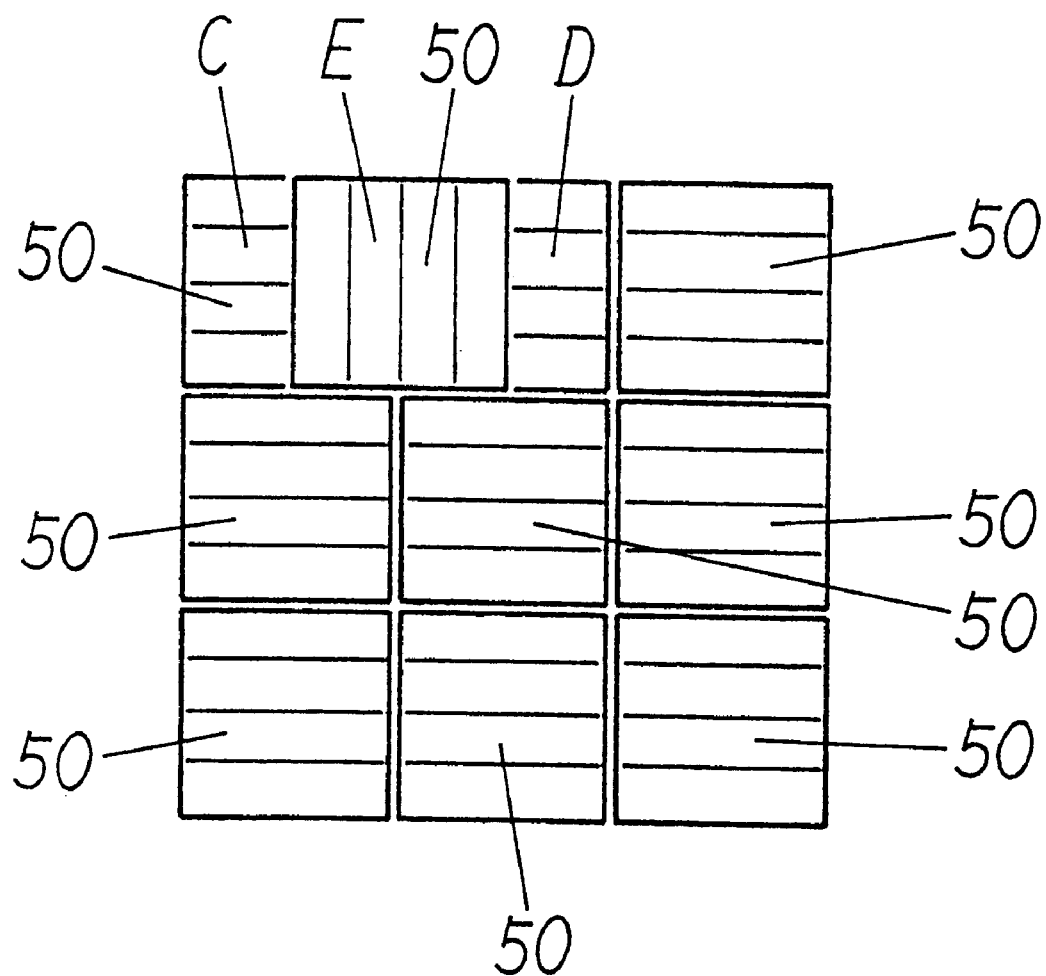
FIG. 15 is a schematic plan view of a state where in a process of stacking the second stage on the first stage, one of the skeleton members of the second stage is laid in crossed and straddling relation to the mountain-shaped portions of two skeleton members juxtaposed in the first stage.

In the above process, one skeleton member (shown at, by way of example, character E in FIGS. 14 and 15) is placed in the Z-axis direction Z on two adjacent skeleton members (shown at, by way of example, characters C, D in FIGS. 14 and 15) in a plane extending in the X-axis direction X and the Y-axis direction Y orthogonal to the X-axis direction such that the mountain-shaped portions of the former skeleton member lie in crossed and straddling relation to the mountain-shaped portions of the latter two skeleton members. Further, bottom recesses (the bottom recesses 57 in FIG. 9) provided in the bottom ends 56 of the mountain-shaped portions 51 of one skeleton member (shown at, by way of example, character E in FIGS. 14 and 15), which is placed in the Z-axis direction Z on two adjacent skeleton members (shown at, by way of example, characters C, D in FIGS. 14 and 15) in the above plane, are engaged with top recesses (the top recesses 55 in FIG. 9) provided in the top ends 54 of the two adjacent skeleton members in the above plane. The two adjacent skeleton members (shown at, by way of example, characters C, D in FIGS. 14 and 15) in the above plane are thereby coupled to each other.

The above-explained embodiment has a disadvantage that a load imposed on the stacked structure 40 is concentratedly applied to the lowermost skeleton member 50. To solve such a disadvantage, lowermost reinforcing members 41, each being flat at a lower surface and substantially triangular, are provided in contact relation to the opposed slopes of the mountain-shaped portions on the rear side, respectively, so as to fill the individual rear-side spaces 52*a* defined on the rear side of the mountain-shaped portions of the lowermost skeleton member 50. Thus, the lowermost reinforcing members 41 bear the load imposed on the stacked structure 40, thereby reducing the load applied to the lowermost skeleton members 50 and improving the strength of the stacked structure 40.

Figure 16:
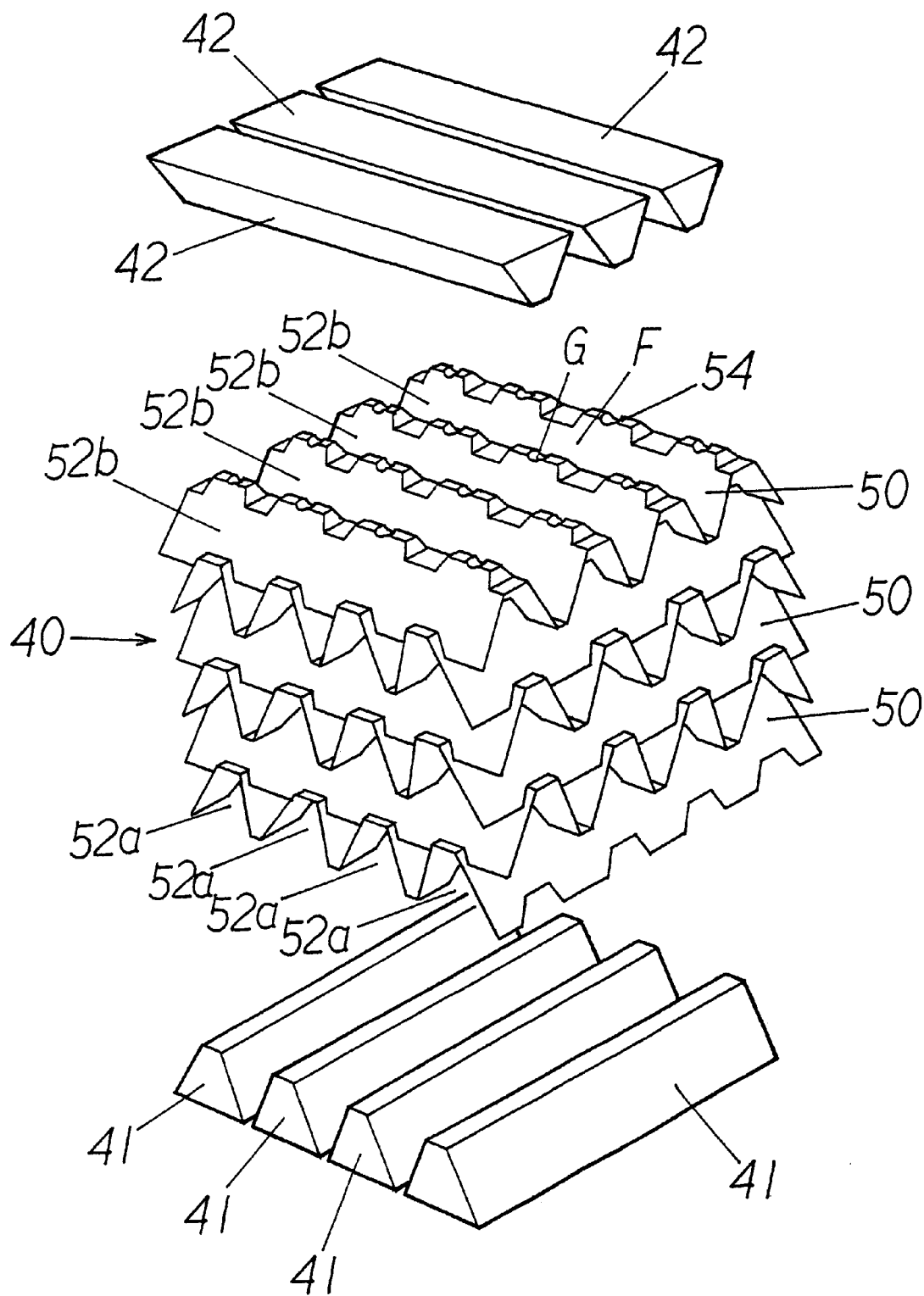
FIG. 16 is a schematic perspective view showing the stacked structure in the case where lowermost reinforcing members and flat surface members are disposed respectively under and over the stacked structure.

Also, the top plate 62 is provided in the above-explained embodiment. Instead of the top plate 62, however, a flat surface member 42 having an upper flat surface may be provided in contact relation to the opposed slopes of two adjacent mountain-shaped portions (shown at characters F, G in FIG. 16) on the front side so as to fill each front-side space 52*b* defined between two adjacent mountain-shaped portions 51 of the uppermost skeleton member 50 on the front side. The upper surfaces of the flat surface members 42 lie flush with the top ends 54 of the mountain-shaped portions.

Further, the above embodiment has been explained as being applied to the water-shielded space. The stacked structure of the present invention can also be employed in a space where rainwater, etc. are temporarily stored and then allowed to gradually permeate into the ground. Such a space may be formed by excavating in the ground, or surrounding a certain area by soil and sand or the like to define an enclosed space.

Figure 17:
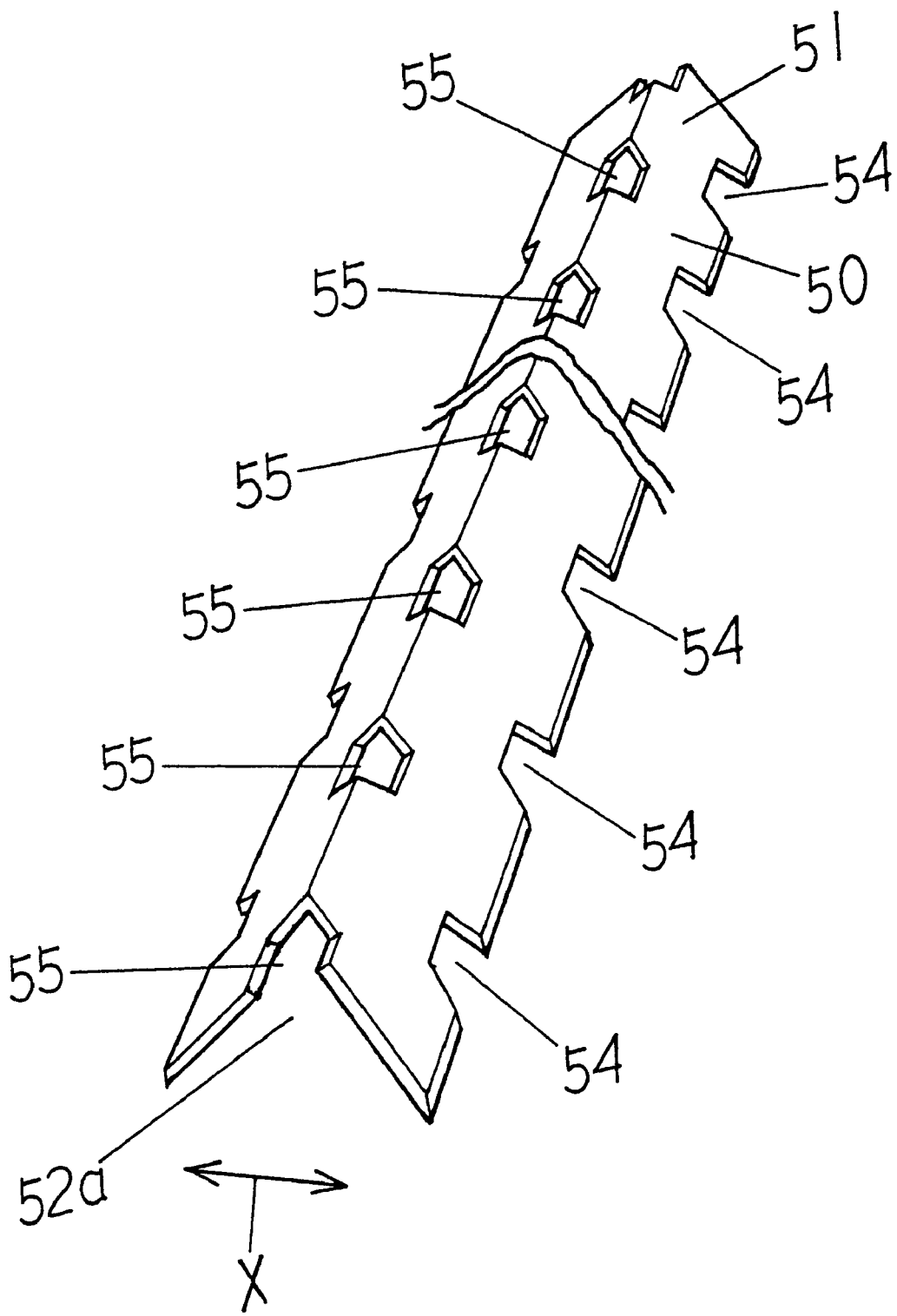
FIG. 17 is a schematic perspective view showing another modification of the skeleton member shown in FIG. 2.

While in the above-explained embodiment the skeleton member 50 has the mountain-shaped portions with substantially mountain-like shapes successively repeated in the X-axis direction X, a skeleton member 50 (plate-like member) modified as described below has the mountain-shaped portion 51 with a single mountain-like shape in the X-axis direction X. In this modification, the skeleton member 50 has an appearance as shown in FIG. 17. Thus, the skeleton member 50 of this modification is obtained by dividing the skeleton member 50 shown in FIG. 2 from each other in units of the mountain-shaped portion.

When stacking the skeleton members 50 together to form the stacked structure 40, therefore, the skeleton members 50 are first arranged side by side to form an assembly with mountain-like shapes successively repeated in the X-axis direction X. Then, the skeleton members 50 are stacked to form successive stages in orthogonal relation. The stacked structure 40 is thus widely adapted for a desired outer configuration size.

Figure 18:
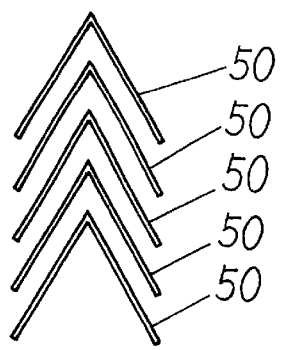
FIG. 18 is a schematic view showing a state where the skeleton members each shown in FIG. 17 are stacked one above another in the same direction.

When the skeleton members 50 as shown in FIG. 12 are placed in the same orientation one above another, they can also be stacked in closely contact relation as shown in FIG. 18. Further, in an intermediate portion of the stacked structure, the skeleton members 50 may be arranged at every other top recess or several top recesses apart. The stacked structure 40 can be thus formed in many variations in consideration of various conditions including installation places.

Figure 19:
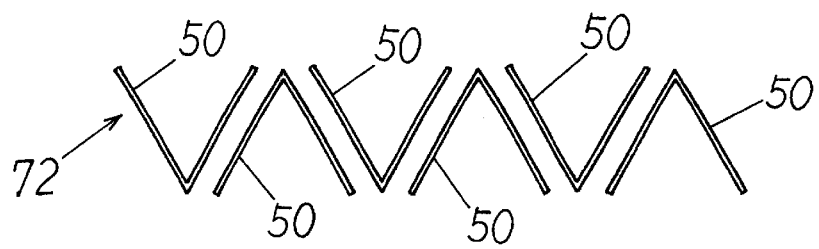
FIG. 19 is a schematic view of a state where the skeleton members each shown in FIG. 17 are arranged in juxtaposed relation.

In addition to the assembly comprising the skeleton members 50 arranged side by side continuously without spacings, an assembly may be formed by (though not shown) arranging the skeleton members 50 at every other top recess, for example. By using the skeleton members 50 each having one mountain-shaped portion 51, the stacked structure can be appropriately adapted for installation places. Also, by arranging those skeleton members 50 in alternately inverted orientations to form an assembly 72 as shown in FIG. 19, the stacked structure 40 can have a higher degree of strength as a whole and can be adapted for a variety of environments in use.

Figure 20:
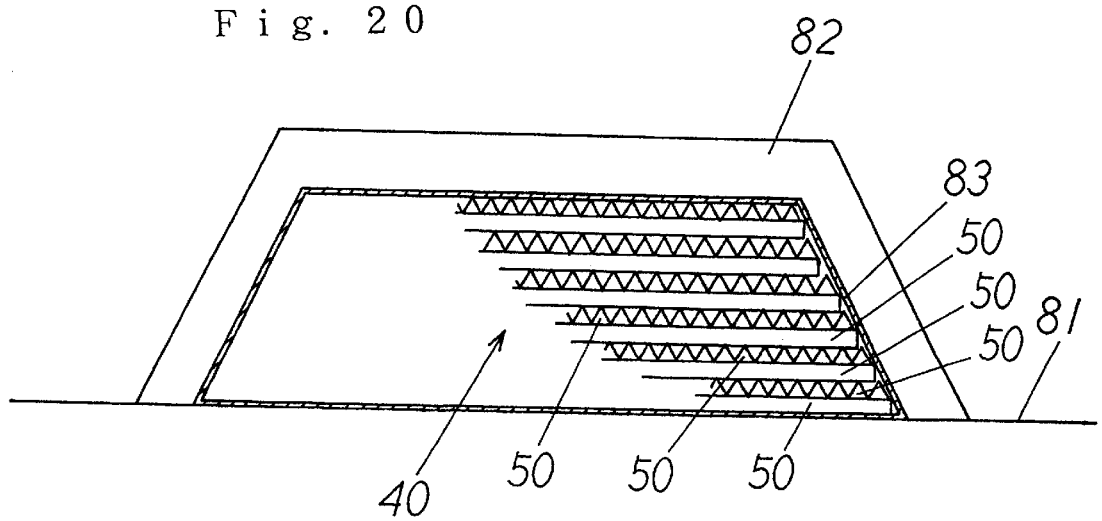
FIG. 20 is a schematic sectional view of a state where the stacked structure according to one embodiment of the present invention is heaped up on the ground.
Figure 21:
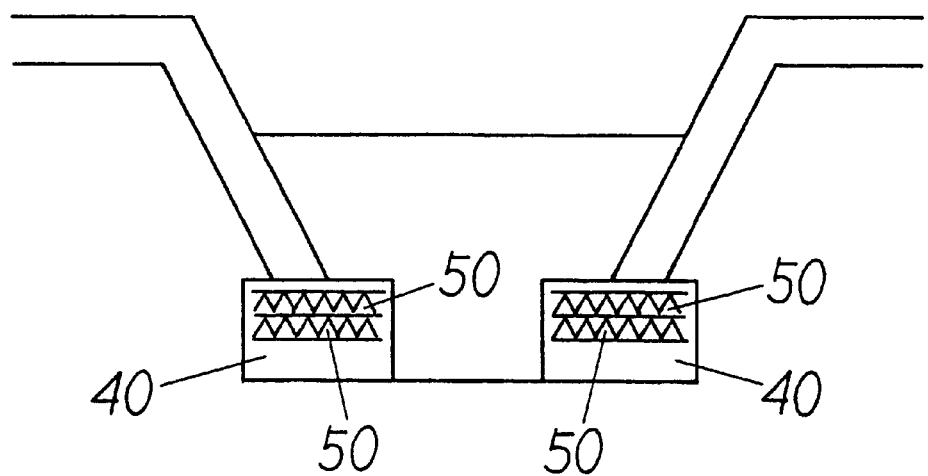
FIG. 21 is a schematic sectional view of a waterway in which the stacked structure according to one embodiment of the present invention is installed.
Figure 22:
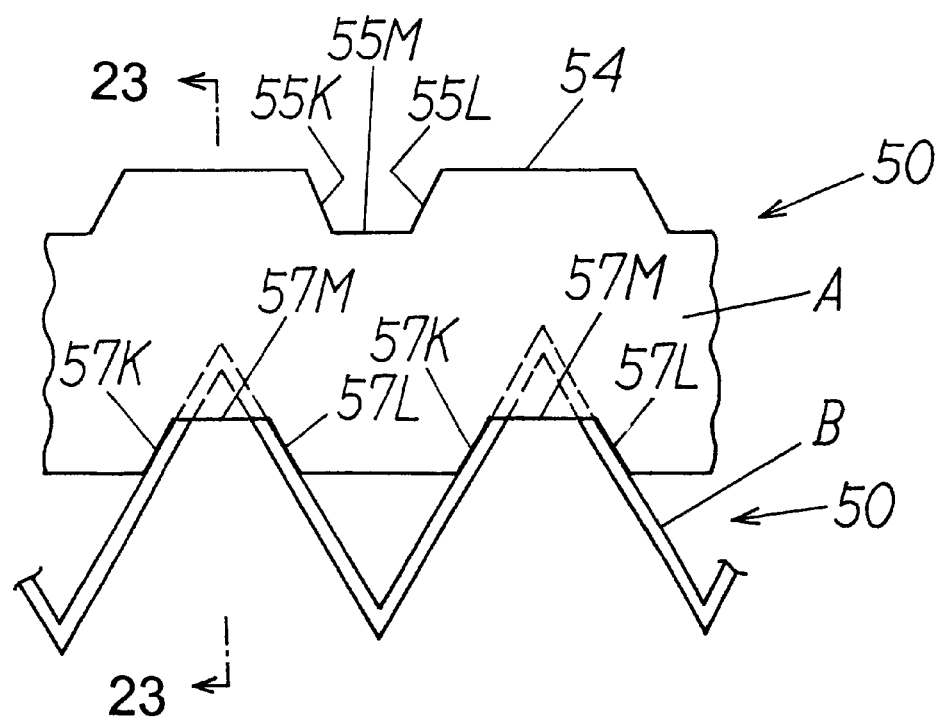
FIG. 22 is an enlarged view of part of FIG. 4.
Figure 23:
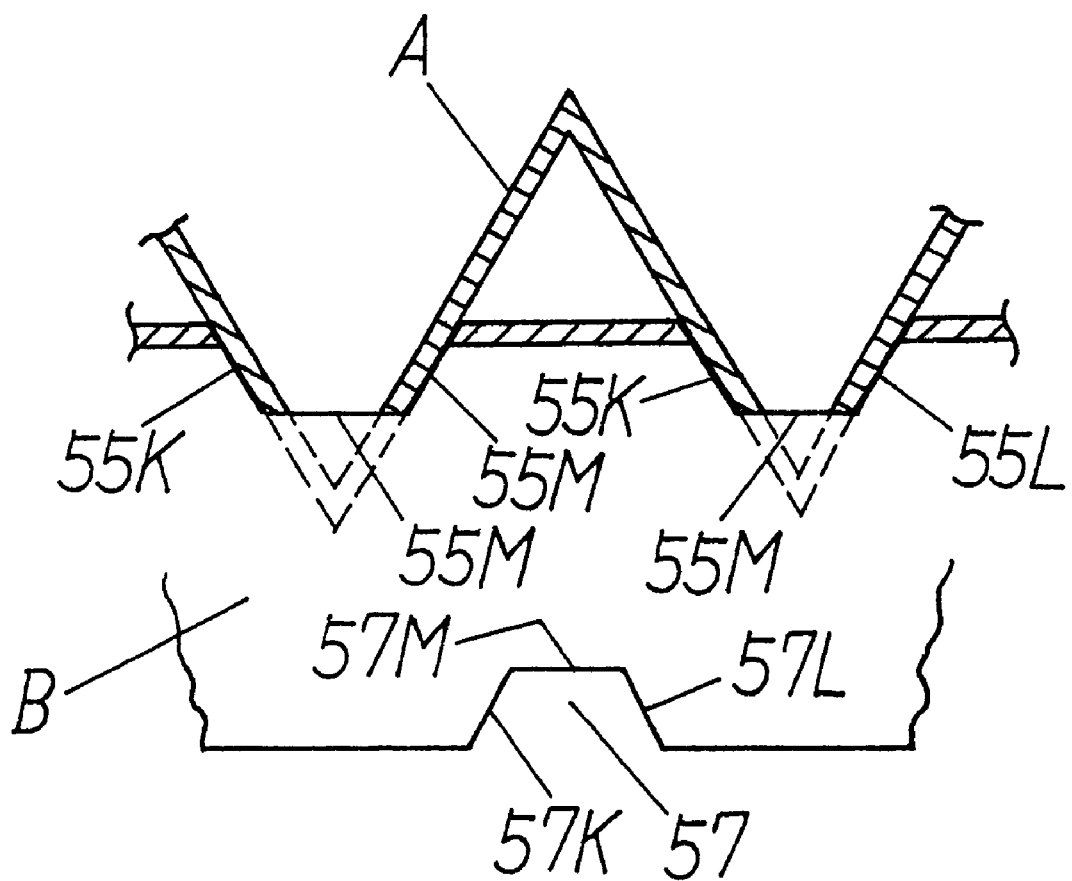
FIG. 23 is a schematic sectional view taken along line 23—23 in FIG. 22.

In the above embodiment, the present invention has been explained as the underground water-storing structure using the stacked structure 40; namely in the stacked structure 40, water is allowed to pass through the openings in the skeleton members 50 and a space including the individual rear-side spaces 52a defined between the skeleton members 50 stacked together is utilized to store water in the underground. However, the present invention is not limited to the above embodiment. For example, as shown in FIG. 20, a level of the ground surface 81 can be raised by using the stacked structure 40 in which the skeleton members 50 are stacked together in crossed relation, and covering only outer surfaces of the stacked structure 40 with earth and sand or the like 82.

Generally, heavy materials such as soil and sand or concrete are used to raise the ground level, but work of reinforcing the foundation is required in places where the foundation is not firm, resulting in a longer term of scheduled work and an increased cost. By using the stacked structure 40 having a space therein, it is possible to omit the work of reinforcing the foundation even in places where the foundation is soft, shorten the term of scheduled work, and cut down a cost. In such a case, to prevent soil and sand or the like from entering the interior of the stacked structure 40, the stacked structure 40 is first surrounded by a sheet 83 and soil and sand or the like 82 is then covered over the sheet 83. Since a load acts on the stacked structure 40 from above due to the surrounding soil and sand, the skeleton members 50 can be maintained in the fitted condition explained above under the load, and therefore the stacked structure 40 can be firmly kept as an integral structure.

Figure 8:
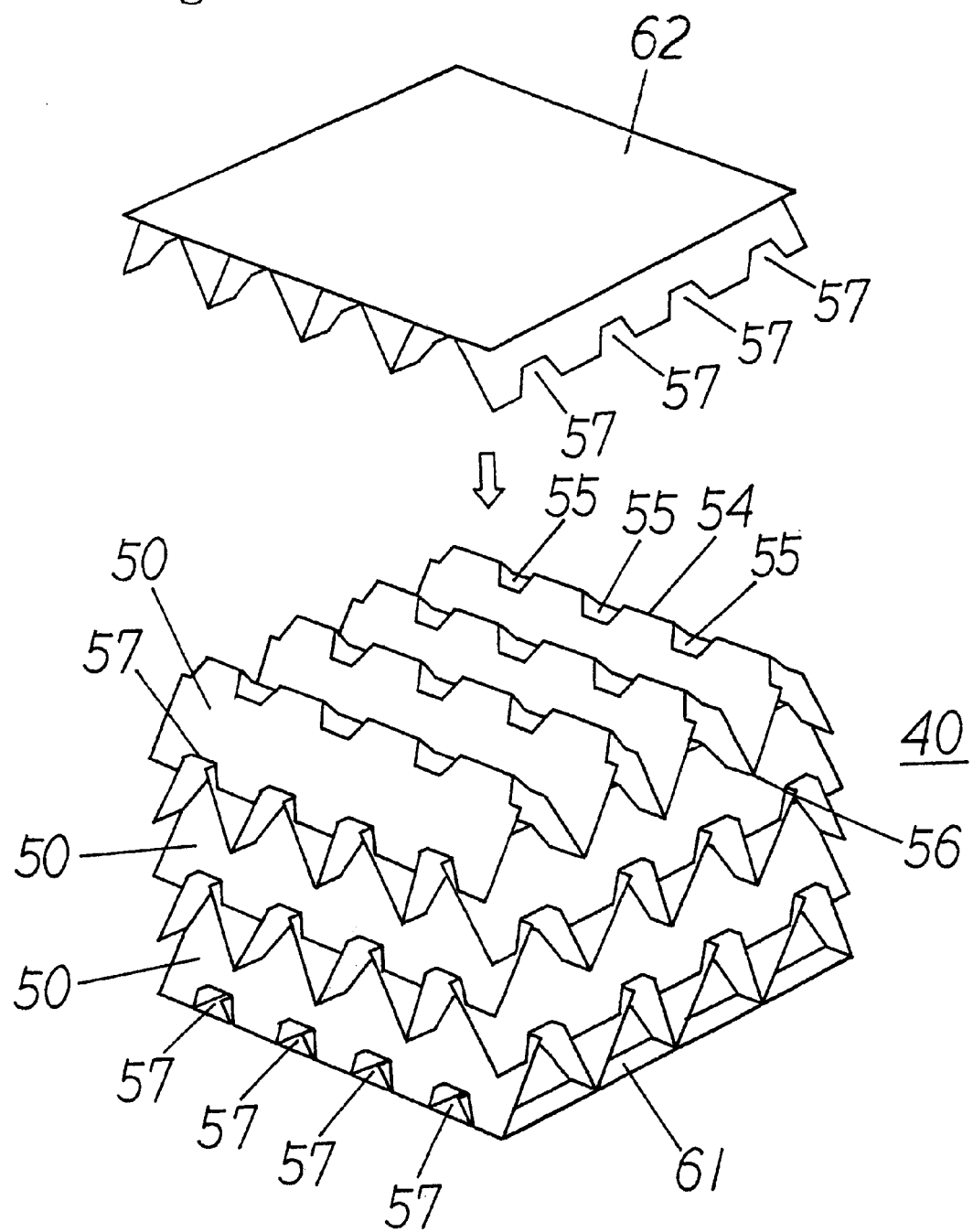
FIG. 8 is a schematic perspective view of the stacked structure according to one embodiment of the present invention.

In addition, the stacked structure 40 in which the skeleton members 50 are stacked together in crossed relation can also be applied to other structures serving as, for example, gathering blocks for fish, wave canceling blocks, waterways, water gates, and walls. When applied to gathering blocks for fish, the stacked structure 40 can be handled as one integral structure by stacking and coupling the skeleton members 50 and the top plate 62 (upper flat plate), as shown in FIG. 8. If a relatively heavy plate is used as the top plate 62, the skeleton members 50 are kept from disengaging from the fitted condition at the cutouts thereof because of the weight of the stacked structure 40 itself and hence fasteners are not required. If the skeleton members 50 are manufactured by, e.g., a synthetic resin other than metals, there is no fear of rusting even with the stacked structure 40 immersed in sea water. Further, since metal-made fasteners are not required, the stacked structure 40 having high durability can be provided without a fear of corrosion such as rusting. A larger number of water introducing holes may be provided, if necessary, to reduce resistance against water flow.

When applied to waterways, the ecology of fish, etc. can be maintained by providing the stacked structure 40 at each of opposite lower ends of a concrete-made waterway. This results in such advantages as making work easier, reducing the term of scheduled work and the cost, and facilitating maintenance. In that case, materials of the plate-like members, the configuration and size of the mountain-shaped portions of each plate-like member, the positions, number and size of the openings, etc. may be determined as required.

With the stacked structure according to the first (second or third) aspect, the skeleton members are relatively light since a space is left between adjacent mountain-shaped portions of each of the skeleton members. Further, when stacking the skeleton members together, bottom ends of the mountain-shaped portions with substantially mountain-like shapes successively repeated in one of two adjacent skeleton members are arranged to cross top ends of the mountain-shaped portions of the other skeleton member. Therefore, the stacked structure having a high degree of strength can be achieved.

With the stacked structure according to the fourth aspect, since the rear side of the mountain-shaped portions is shaped in conformity with the configuration of the mountain-shaped portions on the front side, the skeleton members can be formed to be thinner and lighter in addition to the above-stated advantages obtainable with the first aspect.

With the stacked structure according to the fifth aspect, since reinforcing members are provided to interconnect opposed slopes of the mountain-shaped portions on the rear side for reinforcing the mountain-shaped portions, the stacked structure having a higher degree of strength can be achieved in addition to the above-stated advantages obtainable with the first aspect.

With the stacked structure according to the sixth aspect, the stacked structure can be assembled just by engaging bottom recesses provided at the bottom ends of the mountain-shaped portions in one of two adjacent skeleton members stacked in the Z-axis direction with top recesses provided at the top ends of the mountain-shaped portions of the other skeleton member. In addition to the above-stated advantages obtainable with the first aspect, therefore, the stacked structure can be assembled easily, can firmly hold a stacked state of the skeleton members stacked in the Z-axis direction, and has a higher degree of strength.

With the stacked structure according to the seventh aspect, the stacked structure having a higher degree of strength than obtainable with the fourth aspect can be achieved.

With the stacked structure according to the eighth aspect, the following advantage can be obtained in addition to the above-stated advantages obtainable with the first aspect. When the stacked structure is covered along its peripheries by a shield sheet, for example, to be used as a structure for storing water, water received by the upper skeleton member is introduced to the lower skeleton member through openings provided in the mountain-shaped portions, and individual spaces defined between the adjacent mountain-shaped portions of the skeleton member can be utilized to store water.

With the stacked structure according to the ninth aspect, since lowermost reinforcing members are provided to bear a load imposed on the stacked structure, the load imposed on the mountain-shaped portions of the lowermost skeleton member can be reduced and the stacked structure having a higher degree of strength can be achieved in addition to the above-stated advantages obtainable with the first aspect.

With the stacked structure according to the tenth aspect, a flat surface member having an upper flat surface is provided to be contacted at slopes thereof with opposed slopes of the adjacent mountain-shaped portions on the front side while the upper surface of the flat surface member is lying flush with the top ends of the mountain-shaped portions, thereby providing an upper flat surface of the stacked structure. In addition to the above-stated advantages obtainable with the first aspect, therefore, it is possible to fill front-side recessed spaces which are formed at a top of the stacked structure when it is constructed by stacking the skeleton members one above another.

Further, with stacked structure according to the eleventh aspect, the mountain-shaped portions of the skeleton members each stacked in the Z-axis direction on two adjacent skeleton members in a plane are arranged in crossed and straddling relation to the mountain-shaped portions of the two adjacent skeleton members in the above plane. In addition to the above-stated advantages obtainable with the first aspect, therefore, the skeleton members can be stacked in the Z-axis direction while coupling the two adjacent skeleton members in the above plane to each other, and the stacked structure having a higher degree of strength can be achieved.

What is claimed is:

1. A stacked structure comprising:
a plurality of skeleton members to be stacked together, each skeleton member including a plurality of skeleton parts extending in one direction and situated side by side in a lateral direction perpendicular to said one direction, each skeleton part having one top portion, two bottom portions extending from the top portion, one bottom portion in one skeleton part being connected to one bottom portion in an adjacent skeleton part, top recesses formed at the top portion at a predetermined distance spaced apart from each other, and bottom recesses formed at the respective bottom portions at a predetermined distance spaced apart from each other, said skeleton members forming upper and lower skeleton members to be vertically stacked together, the skeleton parts of the upper and lower skeleton members extending perpendicularly to each other, the bottom recesses of the upper skeleton member being located in the top recesses of the lower skeleton member so that the upper and lower skeleton members are securely assembled together.

2. A stacked structure according to claim 1, wherein each skeleton part is formed of opposed slopes, and includes a front side and a rear side having a shape corresponding to the front side, said rear side forming a rear side space sandwiched between the two bottom portions.

3. A stacked structure according to claim 2, wherein each skeleton part further includes reinforcing members to interconnect the opposed slopes for reinforcing the skeleton part.

4. A stacked structure according to claim 2, wherein said opposed slopes at a top end of each skeleton part has a predetermined angle at the rear side space, and an angle between one opposed slope in one skeleton part and one opposed slope situated adjacent to said one skeleton part and facing thereto has a predetermined angle same as that at the rear side space.

5. A stacked structure according to claim 4, wherein each top recess includes first and second top slopes facing each other to extend from the top end to the bottom portions of each skeleton part and formed in the opposed slopes, and third top flat surfaces connected to the first and second top slopes and extending parallel to the top end, each third top flat surface having a length shorter than that between the first and second top slopes at the top end, said first and second top slopes having an angle same as that of said predetermined angle; and each bottom recess includes first and second bottom slopes facing each other and extending from a bottom end of each of the opposed slopes to the top end, and third bottom flat surface connected to the first and second bottom slopes and extending parallel to the bottom end, said third bottom flat surface having a length shorter than that between the first and second bottom slopes at the bottom end, said first and second bottom slopes having an angle same as that of said predetermined angle.

6. A stacked structure according to claim 1, wherein each of said skeleton parts includes a plurality of openings to allow water to pass therethrough, spaces at rear sides of the skeleton parts storing water in an underground.

7. A stacked structure according to claim 1, further comprising lowermost reinforcing members having flat surfaces at bottoms thereof, said lowermost reinforcing members being located in opposed slopes in the skeleton parts to fill rear-side spaces of a lowermost skeleton member.

8. A stacked structure according to claim 1, further comprising a flat surface member having an upper flat surface to be placed in a space between two skeleton parts of an uppermost skeleton member to form a flat surface at the uppermost skeleton member.

9. A stacked structure according to claim 1, wherein a plurality of said lower skeleton members is situated side by side, and said upper skeleton member is situated above the lower skeleton members so that the skeleton parts of the upper skeleton member extend and cover the skeleton parts of the lower skeleton members situated side by side.

\* \* \* \* \*